United States Patent
Koza et al.

(10) Patent No.: US 11,151,114 B2
(45) Date of Patent: Oct. 19, 2021

(54) LOG READER AND PARSER SHARING DETERMINATION IN A CHANGE DATA CAPTURE ENVIRONMENT

(71) Applicant: INTERNATIONAL BUSINESS MACHINES CORPORATION, Armonk, NY (US)

(72) Inventors: Phillip Koza, San Jose, CA (US); Nirmal Kumar, Bangalore (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 210 days.

(21) Appl. No.: 16/209,292

(22) Filed: Dec. 4, 2018

(65) Prior Publication Data
US 2020/0174989 A1 Jun. 4, 2020

(51) Int. Cl.
*G06F 16/00* (2019.01)
*G06F 16/23* (2019.01)
*G06F 16/27* (2019.01)
*G06F 9/50* (2006.01)
*G06F 16/18* (2019.01)

(52) U.S. Cl.
CPC ........ *G06F 16/2358* (2019.01); *G06F 9/5044* (2013.01); *G06F 16/1805* (2019.01); *G06F 16/27* (2019.01)

(58) Field of Classification Search
CPC combination set(s) only.
See application file for complete search history.

(56) References Cited

U.S. PATENT DOCUMENTS

| | | | | |
|---|---|---|---|---|
| 5,832,508 | A | * 11/1998 | Sherman | G06F 16/2358 |
| 6,014,674 | A | * 1/2000 | McCargar | G06F 16/284 |
| 6,321,234 | B1 | * 11/2001 | Debrunner | G06F 16/217 |
| 8,510,270 | B2 | * 8/2013 | Pareek | G06F 16/27 |
| | | | | 707/635 |
| 8,799,213 | B2 | 8/2014 | Wong et al. | |

(Continued)

FOREIGN PATENT DOCUMENTS

EP 2657859 B1 2/2017

OTHER PUBLICATIONS

Mell, Peter, et al., "The NIST Definition of Cloud Computing", NIST Special Publication 800-145, Sep. 2011, Gaithersburg, MD, 7 pgs.

*Primary Examiner* — Farhan M Syed
(74) *Attorney, Agent, or Firm* — William Hartwell; Matthew M. Hulihan; Heslin Rothenberg Farley & Mesiti PC

(57) ABSTRACT

Log reader and parser sharing determination in a change data capture environment includes obtaining log record identifiers for a group of data consumers of transaction log file data in transaction log files, identifying a respective restart log position and current log position for each data consumer of the group of data consumers, determining transaction log file distances between the restart log positions and the current log positions of each of one or more pairs of data consumers, calculating resource costs for data consumers of each pair to share a log reader and log parser, determining whether to share a log reader and log parser between any two or more data consumers of the group, and performing processing based on the determining whether to share.

20 Claims, 10 Drawing Sheets

(56) References Cited

U.S. PATENT DOCUMENTS

| | | |
|---|---|---|
| 9,244,775 B2 | 1/2016 | Koza et al. |
| 9,244,776 B2 | 1/2016 | Koza et al. |
| 2006/0218204 A1 | 9/2006 | Ofer et al. |
| 2012/0030172 A1* | 2/2012 | Pareek .................. G06F 16/275 707/635 |
| 2014/0279907 A1* | 9/2014 | Koza .................... G06F 16/128 707/639 |
| 2014/0379663 A1* | 12/2014 | Koza .................. G06F 16/2358 707/682 |
| 2016/0328461 A1* | 11/2016 | Ahmed ................... G06F 16/27 |
| 2017/0255529 A1 | 9/2017 | Kedia et al. |

* cited by examiner

LOG READER AND PARSER SHARING DETERMINATION IN A CHANGE DATA CAPTURE ENVIRONMENT

BACKGROUND

Data replication, also referred to as change data capture (CDC), provides trusted data synchronization between a source database and one or more target databases. The source database collects transactions as they are committed and saves them in a repository. Specialized agents send the committed transactions across a network to the target computer where they are received by other specialized agents and applied to the target database. In this way, the target database is a duplicate of the source database. Read-only applications may direct queries to the target database, thereby reducing contention and increasing performance on the source database. Additionally, if the source computer, source database, or network fails, the target database may act as source database.

CDC processes transaction log data that may be read, processed, and parsed ('consumed') by data consumers, for example processes or other software that is interested in the transaction log data. Data consumers utilize a log reader and log parser to read and parse transaction log data. In some cases, multiple consumers can share a log reader and log parser but there may be problems associated with sharing a log reader and log parser.

SUMMARY

Shortcomings of the prior art are overcome and additional advantages are provided through the provision of a computer-implemented method. The method obtains, for a group of data consumers of transaction log file data in transaction log files of a database system, respective log record identifiers, and identifies, based on the log record identifiers, a respective restart log position and current log position for each data consumer of the group of data consumers. The method also determines transaction log file distances between the restart log positions and the current log positions of each pair of one or more pairs of data consumers of the group of data consumers. Based on the determined transaction log file distances, the method calculates resource costs for data consumers of each pair of the one or more pairs to share a log reader and log parser. Based on the calculated resource costs, the method determines whether to share a log reader and log parser between any two or more data consumers of the group of data consumers. The method also performs processing based on the determining whether to share.

Further, a computer system is provided that includes a memory and a processor in communication with the memory, wherein the computer system is configured to perform a method. The method obtains, for a group of data consumers of transaction log file data in transaction log files of a database system, respective log record identifiers, and identifies, based on the log record identifiers, a respective restart log position and current log position for each data consumer of the group of data consumers. The method also determines transaction log file distances between the restart log positions and the current log positions of each pair of one or more pairs of data consumers of the group of data consumers. Based on the determined transaction log file distances, the method calculates resource costs for data consumers of each pair of the one or more pairs to share a log reader and log parser. Based on the calculated resource costs, the method determines whether to share a log reader and log parser between any two or more data consumers of the group of data consumers. The method also performs processing based on the determining whether to share.

Yet further, a computer program product including a computer readable storage medium readable by a processing circuit and storing instructions for execution by the processing circuit is provided for performing a method. The method obtains, for a group of data consumers of transaction log file data in transaction log files of a database system, respective log record identifiers, and identifies, based on the log record identifiers, a respective restart log position and current log position for each data consumer of the group of data consumers. The method also determines transaction log file distances between the restart log positions and the current log positions of each pair of one or more pairs of data consumers of the group of data consumers. Based on the determined transaction log file distances, the method calculates resource costs for data consumers of each pair of the one or more pairs to share a log reader and log parser. Based on the calculated resource costs, the method determines whether to share a log reader and log parser between any two or more data consumers of the group of data consumers. The method also performs processing based on the determining whether to share.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are approaches for coordinating whether and when transaction log data consumer(s) (also referred to herein as "log data consumers", "data consumers" or simply "consumers") in a change data capture environment are to share a log reader/parser, for instance based on whether sharing a log reader/parser is more efficient than using private readers/parsers for the consumers, or perhaps reloading the relevant data tables for one or more consumers.

Figure 1:
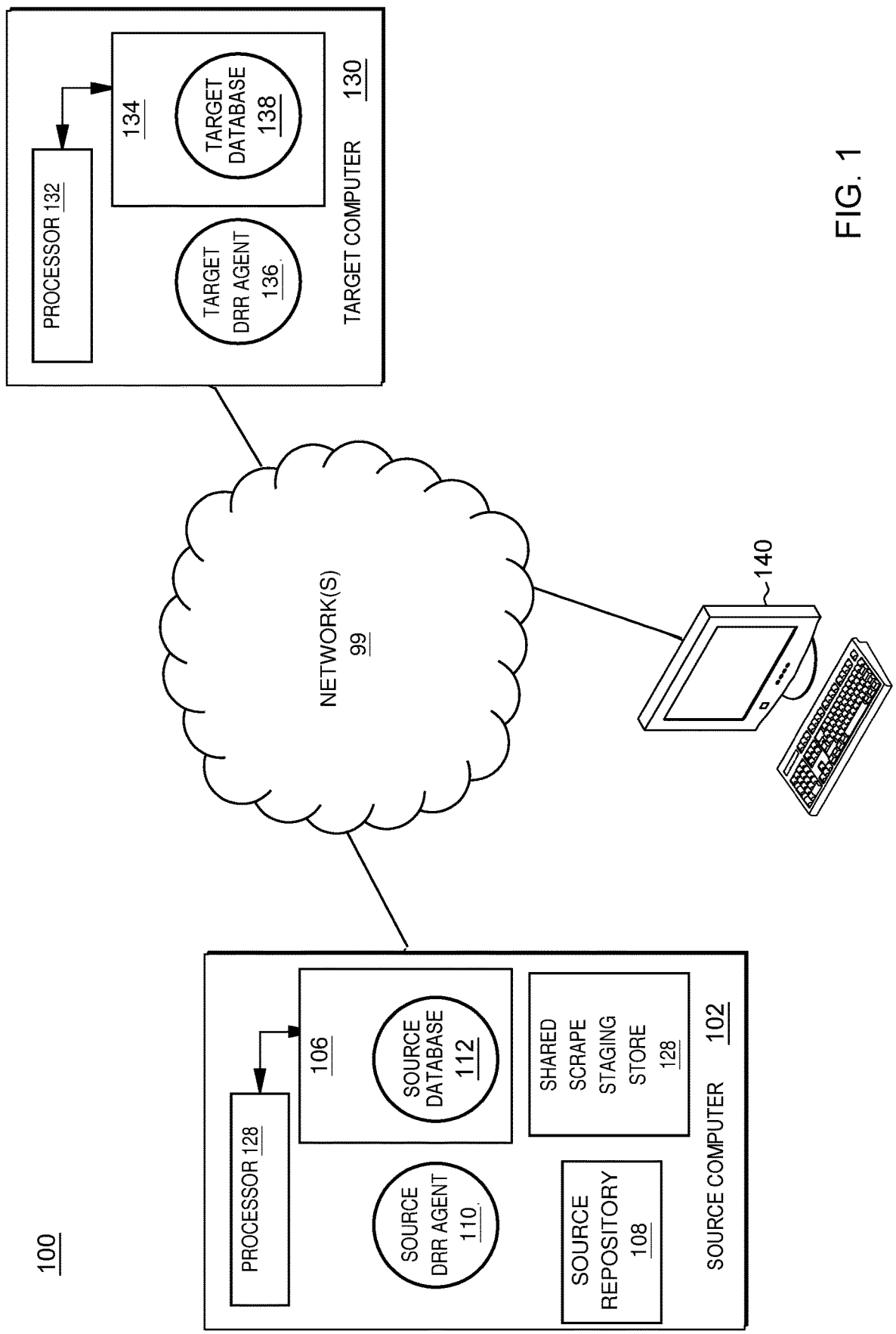
FIG. 1 illustrates an example computer system environment to incorporate and use aspects described herein.

FIG. 1 illustrates an example computer system environment to incorporate and use aspects described herein. An exemplary change data capture (CDC) computer system 100 is operable for data replication. CDC is the process of capturing changes made at the data source and applying them to target(s). In this illustrative example, the CDC computer system 100 includes a source computer 102 and target computer 130 that receives committed transactions from the source computer 102. In other embodiments, there may be additional targets. Each computer 102, 130 includes a respective at least one processor (104, 132, respectively) and a respective at least one storage device (106, 134 respectively). The CDC computer system 100 additionally includes in this example an administrative client computer 140, also having at least one processor and at least one storage device. Each computer (and administrative client) in the networked computer system 100 communicates over one or more network(s) 99. The network(s) 99 may include various types of communication networks, such as a wide area network (WAN), local area network (LAN), a telecommunication network, a wireless network, a public switched network and/or a satellite network. The source computer 102, target computer 130, and the administrative client computer 140, may each be implemented as separate physical computers, as virtual partitions on one or more physical computers, or on any combination thereof.

Source computer 102 in the CDC computer system 100 includes a source database 112, and target computer 130 includes a target database 138 configured to receive change data records from the source database 112 on the source computer 102. The target database 138 may include a relational DBMS, such as IBM®, DB2® (IBM and DB2 are trademarks of International Business Machines Corporation, Armonk, N.Y., U.S.A.), or ORACLE® (ORACLE is a trademark of Oracle Corporation, Redwood Shores, Calif., U.S.A.), and/or a non-relational DBMS, such as Apache™, Hadoop® (Apache and Hadoop are either registered trademarks or trademarks of the Apache Software Foundation, Forest Hill, Md., U.S.A.).

The CDC computer system 100 includes one or more source DRR agents 110, one of which is shown. The source DRR agent 110 and a target DRR agent 136 are added in the data replication configuration to enable replicating, selectively, transactions that are committed on the target database 138. DRR agents 110 and 136 are two CDC replication agents.

The source DRR agent 110 extracts the transaction records from the database transaction logs that the source database 112 writes and stores in source repository 108 the transaction records that are destined for the target database 138. The content and format of the transaction records may depend upon the vendor's implementation of the source database 112, but typically include one or more entire table rows. Note a transaction log may also be referred to herein as "transaction log file", "log file" and/or "log". Any reference herein to "log file" is to be understood to analogous to a "transaction log file" of a transaction log.

When a commit of a transaction is seen, the source DRR agent 110 extracts the records for that transaction from source repository 108 and uses these transaction records to build and maintain the Shared Scrape Staging Store 128.

Note that any log records from 108 that are for transactions that are aborted are thrown away.

As described above, when a Relational Database Management System (RDMS) (such as Oracle®, DB2, MSSQL, Sybase® (a registered trademark of SAP SE, Walldorf, Germany), or Informix® (a registered trademark of International Business Machines Corporation) as examples) makes changes to the database, it writes log records that contain the data necessary to redo and undo that operation in case of a failure. These log records can be used by the CDC replication system to replicate the changes to a different database. Each database has a way of identifying each log record. These identifiers are referred to herein as a "Log Record Identifier" (LRI). CDC replication systems replicate only committed transaction data, storing the log records for a transaction until either a commit or an abort of the transaction is seen. If a commit is seen, the log records are replicated. If an abort is seen, the log records are thrown away. The uncommitted log records are typically not stored in persistent storage, and therefore would be lost if there is an uncontrolled stop of the CDC replication process. Therefore, the CDC system remembers the LRI of the oldest uncommitted log record in its store in case it needs to read the stored log records again. This LRI is referred to herein as the "restart log position". The CDC replication system also keeps track of the LRI of the last record of the last committed transaction that has already been replicated. If the log records need to be read again from the restart position to reconstruct the store of uncommitted log records, any log records for transactions for which the commit was seen and have been replicated will be seen again. The CDC system needs a way to ensure these log records are filtered-out when it is determined they are for transactions that have already been replicated, i.e. when the commit is seen. Therefore, the CDC system remembers the LRI of the last log record that was successfully replicated. This LRI is referred to herein as the "current log position".

Within a given CDC system, there can be multiple consumers of the data, each with a potentially different restart and current position. It can be advantageous to have these multiple consumers share the same log record reader and log record parser. The reader and parser are typically provided as, or part of, a common module or component, though a discrete reader and a discrete parser may exist for a given consumer. In any case, references to "log reader and log parser", "log reader/parser", or just "log reader" herein are used interchangeably to encompass the reader and parser functionality for a consumer.

Sharing a log reader and log parser reduces input/output (I/O) and processor (e.g. Central Processing Unit (CPU)) usage. Another benefit is it reduces I/O contention on the transaction log(s) (also referred to interchangeably herein as "transaction log file(s)", "log file(s)", and/or "log(s)"). Having multiple threads (i.e. corresponding to the consumers) all accessing the same transaction log file stream means they will all be accessing the same physical disk drives, and if they do not get cache hits they will be moving the disk spindle back and forth, causing a new seek with each request. Having multiple consumers share the same log reader and parser is advantageous when the restart log positions of the sharing consumers are 'close' to each other and the current log position of the sharing consumers is 'close' to each other. Two log positions are 'close' if there is not too much distance in the log between them. 'Distance' refers the number of bytes of log data in the transaction log(s) that separate the log records identified by the two log positions, and the measure of 'too much' is relative and case-specific. If two restart positions are close, then when reading from the oldest restart position, the farther-ahead consumer (the consumer with the restart position at a newer record in the log) will not have to wait undesirably long before the uncommitted transaction log records it needs are processed. If two current positions are close, the farther-ahead consumer will not have to wait too long before the committed transaction log records it needs are processed. If one consumer might need to wait a long time for the data it needs to appear on account of sharing with a consumer that is farther behind, it is likely undesirable for that consumer to utilize that log reader and log parser. In this case, that consumer could run with a "private" log reader and parser. However, a consumer running with a private log reader/parser may be allowed to join the shared log reader/parser if the shared log reader/parser catches up to it. Another option is to not start reading from the oldest restart position if it is determined not to be close to the other consumers. Any consumer with restart or current position that is before that of the shared log reader and parser could run with a private log reader and parser, however be allowed join the shared log reader/parser if it catches up to it. The basic approach is to have the shared log reader/parser used by the largest number of consumers that are near each other, and those that are not are to run with a private log reader and parser.

The shared log reader/parser reads the log, parses the log records, and stores the resulting operations in a "staging store" where the data consumers that are allowed to join get their data. The staging store may be on the source computer. If a transaction commits, the data is put into a staging store and await transfer to the target. The staging store can be shared between multiple subscriptions, each subscription being a matching pair of a source set of tables with a target set of tables. The data sits in the staging store until a subscription is ready to take that data, and the data gets sent to the target of that subscription. If some consumers sharing a reader/parser are slow to get this data from the staging store, the size of the staging store could grow to be undesirably large. In this case, the oldest blocks of data are deleted and any consumers who still need that data will be "kicked out" and have to run with a private log reader and parser. As mentioned previously, the consumer might be able to re-join the shared log reader/parser if it catches back up to it. However, it can be difficult to know at the inception of a consumer whether that consumer should be allowed to join a shared log reader/parser.

One advantage of being able to determine the distance between two log positions is that it enables comparison of restart and current positions of a consumer against the Head-Of-Log (HOL) restart and current log positions. HOL refers to a current position of the log. The HOL is captured on a reload initiation. After the reload, in order to reload the tables, it is desired to capture any changes that occurred since loading. The HOL is used as the new restart position after the reload (i.e. to read from that point onward, in order to capture the most up to date information.

In cases where a consumer is relatively very far back in the log (its restart and current log positions are too far back), it may be better to reload all tables in which that consumer is interested, and then start mirroring from the restart and current position of the first table that was loaded. In this regard, another way of replicating is a batch method in which rows in the target are deleted and replaced with full-scale copies of rows from the source table. But there can be issues with this, in particular that reloading a table can take a long time. Nevertheless, it may make sense to perform a table reload from time to time. To make these determinations, and in accordance with aspects described herein, the distance between two log positions is measured and utilized. In many databases, however, a LRI is an abstract entity and it may not be possible to determine the distance between two LRIs directly from the LRIs themselves. Additional data and algorithms may thus be utilized, in accordance with aspects described herein. For instance, aspects present algorithms to correlate database LRIs to actual positions in the log and to determine, e.g. as an estimate, the distance, e.g. a number of bytes, between the log positions. Based on this log distance between positions, the I/O cost to read that many log record bytes, the processing (e.g. CPU/time) cost to process those bytes, and the processing (e.g. CPU/time) cost to parse the column values contained in those log records may be determined, e.g. as an estimate. Then it may be determined, based on these costs, whether a consumer is to share a log reader and log parser with another consumer or group of consumers, or if a given consumer would be better off using a private reader/parser or reloading its tables.

Approaches for computing log distance between LRIs for Oracle® and DB2® LUW database products are now described. An LRI in Oracle® is an abstract entity called a System Change Number (SCN). An SCN is collate-able between different nodes in an Oracle® Real Application Clusters (RAC) system, i.e. the node log readers all share the same SCN sequence. Each RAC node has its own set of transaction log files, but the log records within those log files share the same SCN sequence. Oracle® uses an SCN together with additional information to identify a log record. There is no direct correlation between an SCN and a physical location in a transaction log file, thus an approach is presented that can make that correlation.

To determine (e.g. estimate) the distance between two SCNs X and Y, with X being the first (i.e. smaller, older, farther-back position in the log) and Y being the second (i.e. larger, newer, more recent position in the log), the name of the first archive log file in which each SCN appears is obtained using a query. An example query is: Select name, first_time from v$archived_log where <SCN> between first_change # and next_change #.

Figure 2:
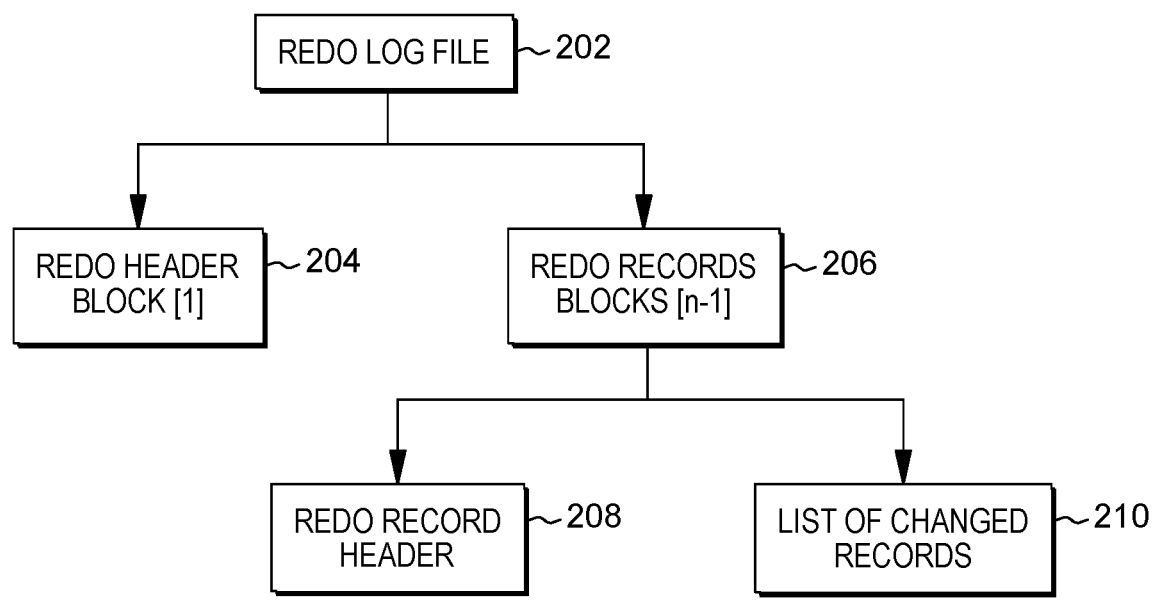
FIG. 2 depicts an example transaction log file structure.

It is additionally determined from where in this log file to start processing log records. FIG. 2 depicts an example transaction log file structure for a redo log file 202. Redo log file 202 includes a redo header block and one or more redo record blocks. The first block 204 is block 1, the redo header block having header information, a checksum, and other data. Redo records blocks 206 start from block 2 and each records data and the list of change records, and are where the transaction data resides.

The size of a redo log file can be calculated by multiplying the BLOCKS and BLOCK_SIZE columns of the V$archived_log Oracle® metadata table, or by using an operating system command. The first block 204 is the header block. Each redo records block 206 after the header block has a redo record header 208 and a list of changed records 210. The redo record header 208 contains the Redo Byte Address (RBA), which is the starting point of redo log records in that block and has the following components: a) log sequence number, b) block # in the redo log, c) byte offset from the beginning of the block along with other information like thread #, length of records in bytes, and the SCN. Of particular interest is the SCN. The method searches for a target SCN in each redo record header 208, sequentially, from the beginning of the file until finding the first redo record header 208 with that SCN or an SCN that is greater. Assume block y is the redo record block 206 with that header. If what was found in the header was an SCN greater than the target SCN, set y=y-1 (since the first occurrence of the SCN must have occurred in the previous block). If there are n blocks in a log file and the first occurrence of the target SCN in the yth block, then this information can be used to approximate how much data is before this SCN and how much data is after it. For example, if there are 100 blocks in a redo log file, the SCN was found in the 11th block at offset 1000 bytes from beginning of the block, and each block size is 512 kilobytes (KB), then after this SCN there will be (89 blocks of 512 KB each)+(512 KB−999 bytes), which equals 90*512 KB−999 bytes. Before the target SCN, there will be (10 blocks of 512 KB each)+999 bytes within blocky before the SCN), which equals 10*512 KB+999 bytes. The byte offset of the SCN in the block may be obtained or know. For instance, redo records block information can indicate the byte offset of the SCN in its block, as the RBA can have the byte number of the SCN within the block.

The above calculations are performed for both SCN X and SCN Y. If SCN X is in a first log file and SCN Y is in a second, different, log file, then the distance (number of bytes) between X and Y is: <number of bytes after SCN X in first log file with SCN X>+<sum of the sizes of all log files between the first log file (with SCN X) and the second log file (with SCN Y)>+<number of bytes before SCN Y in the second log file (with SCN Y)>.

If SCN X and SCN Y are in the same log file, the distance is: (number of bytes before SCN Y)−(number of bytes before SCN X). In this instance, the SCN X offset in the file is subtracted from the SCN Y offset in the file.

Figure 3:
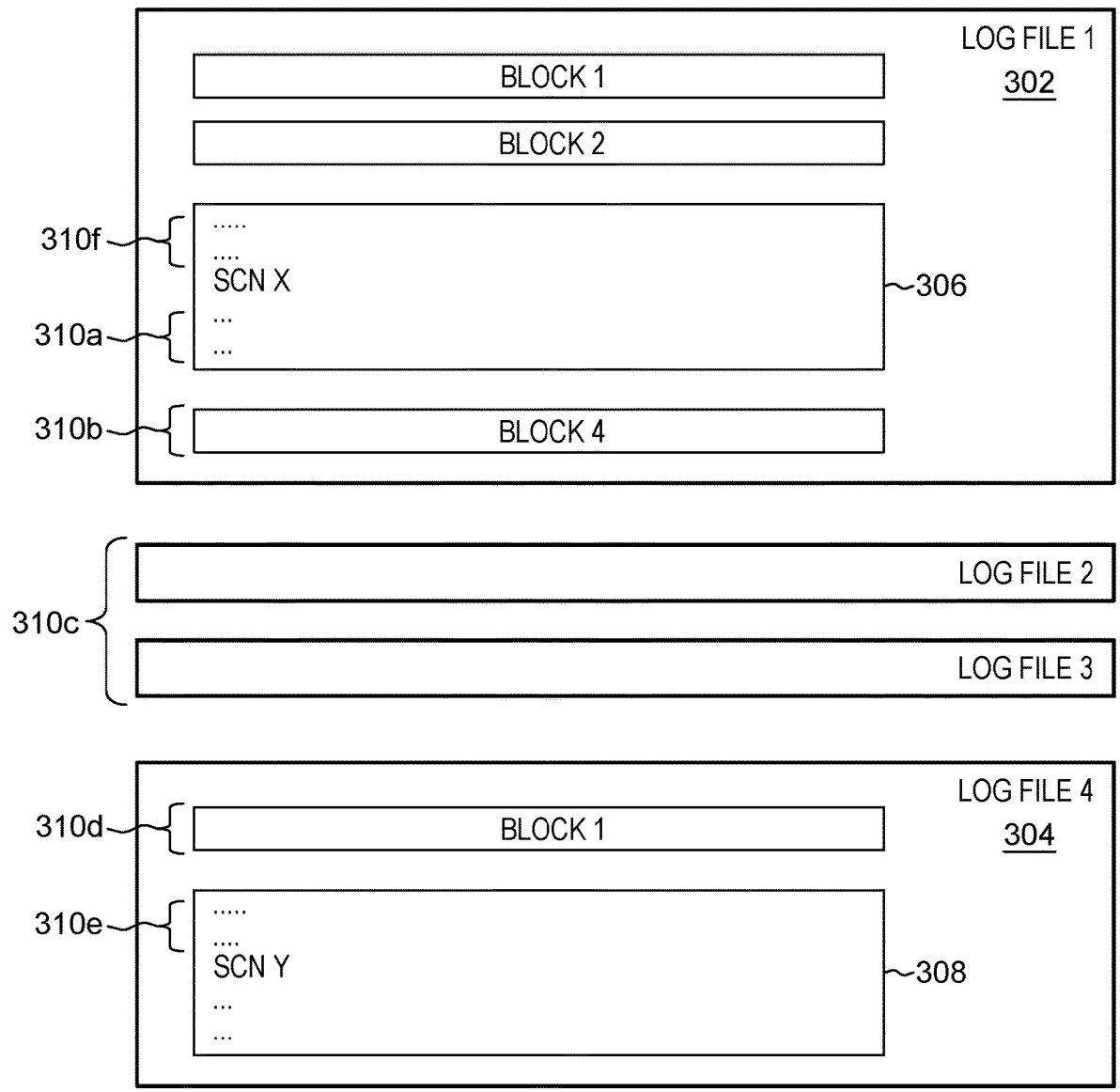
FIG. 3 depicts example transaction log file components for determining distances between log record identifiers, in accordance with aspects described herein.

FIG. 3 illustrates this by depicting example transaction log file components for determining distances between log record identifiers, in accordance with aspects described herein. In this example, there are four log files (1, 2, 3 and 4), SCN X appears in block 3 (306) within log file 1 (302) and SCN Y appears in block 2 (308) within log file 4 (304). SCN Y is offset by a number of bytes (310*e*) within (i.e. from the beginning of) block 308. There is also a number of bytes (310*a*) between SCN X and the end of block 306, which can be determined by subtracting from the size of block 306 the number of bytes (310*f*) by which SCN X is offset from the beginning of block 306. Thus, the total byte distance between SCN X and SCN Y in this example is: (i) 310*a* (the distance to the end of block 306)+(ii) 310*b* (the total size of the remaining block(s) in log file 1 after block 306–in this example just block 4)+(iii) 310*c* (the total size of the log files 2 and 3 between the log files 1 and 4 in which SCN X and SCN Y respectively appear)+(iv) 310*d* (the total size of the block(s) in log file 4 before block 308)+(v) 310*e* (the offset of SCN Y in its block 308).

The SCN for a log record will be whatever the latest SCN was when that log record was generated. Many log records may have the same SCN. If the log is written serially, the log record SCNs will be in ascending order in the log. However, Log Writer (LGWR), an Oracle® background process, writes the content of redo log buffers to the on-line redo log files. Some versions of Oracle® employ multiple LGWRs to write the redo log buffers to redo log files in parallel, and therefore the SCNs may not be in ascending order inside a log. Since the SCNs could be out-of-order inside the log, the approach described above to estimate the number of bytes of log data between two SCNs (and therefore that would be processed if sharing a log reader and log parser) could be merely an estimate. To more accurately know which log records would actually need to be processed (i.e. those of the SCNs between SCN X and Y) any out-of-order log records are to be accounted-for. This can be accomplished as follows: assume the target SCN for processing is SCN P.

Assume that the redo record header RBA for a block is for the log record with the smallest SCN in the block, not just the one that happens to be first. Read forward from the beginning of the block that is determined to contain the first occurrence of SCN P, looking for the first log record with that SCN. As this proceeds, compute the offset of each log record within the file. When the first log record with that SCN is found, remember its offset. Continue to read forward in the file from here, checking the SCN for each log record to see if it is less than SCN P. If so, it is an out of order log record and therefore add its length to a sum of out of order log records that is being maintained. Continue this until a "global SCN" is seen that is greater than or equal to SCN P. A global SCN is a form of synchronization point and guarantees that no log records with an SCN that is larger than the global SCN will be seen after the global SCN. Then, add the sum of the out of order log records to the offset where SCN P was first seen to produce the "adjusted offset". If SCN P=SCN X, the length of the file minus the adjusted offset is the # of bytes that would need to be processed from the log file. If SCN P=SCN Y, the adjusted offset is the number of bytes that need to be processed from that log file.

In DB2 LUW database implementations, different versions have different LRI formats. One such format is called a Log Resource Identifier (LRI). In this format the LRI is 16 bytes long and may be one of two types. Type #1 is an 8 byte Log Flush Sequence (LFS) and an 8 byte Log Sequence Number (LSN). Type #2 is an 8 byte Stream ID and an 8 byte Log Stream Offset (LSO).

A Type-1 LRI is collate-able between different DB2 pureScale® (a registered trademark of International Business Machines Corporation) system nodes, each of which has its own log stream (set of log files). However, it has no correlation to the actual number of bytes being read from the log. A Type-2 LRI is not collatable between different pureScale® system nodes, but there is a correlation to the actual number of bytes being read from the specified node log stream. In a Type-2 LRI, for a pureScale® system the Stream ID identifies the node. For non-pureScale® systems, the Stream ID will be the same. The LSO is the offset of the log record from the beginning of the log stream. So, if two Type-2 LRIs are from the same node, subtracting the LSOs yields the number of log record bytes separating them.

Every log record contains both forms of an LRI. Type-1 is what CDC passes to the DB2 log reader application programming interface (API) as the position from which to start reading log records. Type-2 is used by DB2 for undo processing. CDC uses it when processing a rollback to savepoint. CDC saves both types of LRI in its internal representation of a log record. So the Type-2 LRI from a log record can be used for purposes described herein. However, the type-2 LRI may be saved together with the Type-1 LRI anywhere a Type-1 LRI is stored. For example, a consumer restart position and current position could contain both the Type-1 LRI and Type-2 LRI.

One example scenario for determining when any two of more data consumers of a group are to share log reader and log parser is when a shared log reader and parser does not yet exist and the staging store is empty. In this scenario, it is decided which data consumers are to share a log reader and parser, and what the starting point for that reader to read the log will be. Another example is when a shared log reader and parser already exists and it is decided whether an additional consumer is to share that log reader and parser.

For both scenarios, costs are computed, as described herein, that arise when pairs of data consumers share a reader. These costs include a) cost A to read bytes from the log, b) cost B to process bytes for in-scope uncommitted log entries (in-scope referring to the fact that a consumer has been configured, e.g. by a user, to replicate for those entries), and c) cost C to parse the log record "payload" (column value) bytes for in-scope committed log entries. A "cost" can be a measure of time, i.e. milliseconds. Specific examples of how to compute these costs using the log distance are described in further detail below.

Taking the first scenario (when a shared log reader and parser does not yet exist and the staging store is empty, the sharing determination for a group of data consumers begins by assuming that a shared log reader and parser will start log reading at the restart position for the consumer with the oldest restart position (call this the "first" and "oldest" consumer of the group). Also assume that the current log position for that same consumer is where log entry parsing will begin. These restart and current log positions are the "base" positions. It is almost always true that the consumer with the oldest restart log position also has the oldest current log position, but it is possible this is not true. To handle the case where it is not true, any consumer having a current log position older than (less than) the current log position of the first consumer whose restart position was chosen as the restart log position for the share reader/parser is excluded from the group.

For each other consumer of the group, other than the first data consumer, the extra cost to read the bytes it doesn't need (cost A), the extra cost to process the bytes it doesn't need (cost B), and the extra cost to parse the bytes it doesn't need (cost C) are computed. The sum of costs A, B and C (termed the "resource cost") is the extra time the later/newer consumer will have to wait before the shared log reader/parser will start processing the log records it is interested in, as compared to using its own private log reader and parser. This extra time will directly affect the "latency", i.e. the difference between the time the log records were generated by the database and the time they are available to be applied to the target database. An admin or other user may have indicated a maximum amount of (threshold) latency tolerable for any given consumer. For example, the user may set the threshold at 60 seconds of increased latency for a consumer to share a log reader/parser in order to reduce the number of log readers and parsers and reduce contention to the log. A consumer is allowed to participate in the shared log reader and parser if the resource cost (extra time it has to wait) does not exceed the maximum amount of extra latency set by the user.

Note it is possible that the consumer with the oldest restart position could be an outlier, with its restart position being much older than the restart positions for the other consumers of the group. Using that consumer's restart position as the log reader start position may not yield the highest number of (or even any) other consumers of the group that are able to share the log reader and parser with that oldest consumer. Thus, if all other consumers of the group are not allowed (as dictated by the respective thresholds) to share the log reader and parser using the oldest restart position, the sharing determination is iterated from a selected second oldest, third oldest, etc. consumers of the group. At each iteration, any consumers older than the selected consumer in that iteration is disregarded. This is repeated until either all remaining consumers in an iteration (the selected consumer and all younger consumers of the group) are allowed to share the log reader/parser, or there is only one remaining consumer (which would be the youngest/newest of the original group). Note that a consumer can use the shared log reader and parser only if its restart position is greater than or equal to the chosen restart log position for the shared reader. This is why, at each iteration, the consumer(s) with older restart log positions than the selected consumer is/are excluded.

Thus, initially, the process determines which consumer(s) of the initial group can share with the oldest consumer of the group. If at least one consumer cannot, the 'group' is redefined to exclude that oldest consumer. The process repeats, where the determination is made at to which consumers (of the redefined group) can share with the oldest consumer (of the redefined group). This continues until all consumers of a group can share a log reader/parser, or there is only one consumer left. If all consumers of a group can share the log reader/parser, then those consumers are the ones to share. Otherwise (i.e. the iterating has stopped because only one consumer remains in the redefined group), all groups were processed and none enable all consumers of a given group to share. In that case, the group for a greatest number of consumers could share is selected. The start position for the shared log reader/parser is the restart log position of the oldest consumer of that group. That oldest consumer and the other consumers, of that group, that are allowed to share the log reader and parser with that consumer are the consumers that are to share the reader/parser. If there is a tie (two or more groups have the greatest number of constituent consumers who can share), then the selected group is the one with the newest log reader start position (i.e. the group having the most new oldest consumer). The reason this group is selected in the case of a tie is because it is easier for a consumer running with a private parser that is behind the shared log reader/parser to catch up to it than it is for the shared log reader/parser to catch up to a private reader/parser. This is because the private reader/parser processes only log records that are in-scope for that consumer, whereas the shared log reader/parser processes log records in scope for all consumers. A private parser would typically be faster than the shared log reader/parser.

Figure 4:
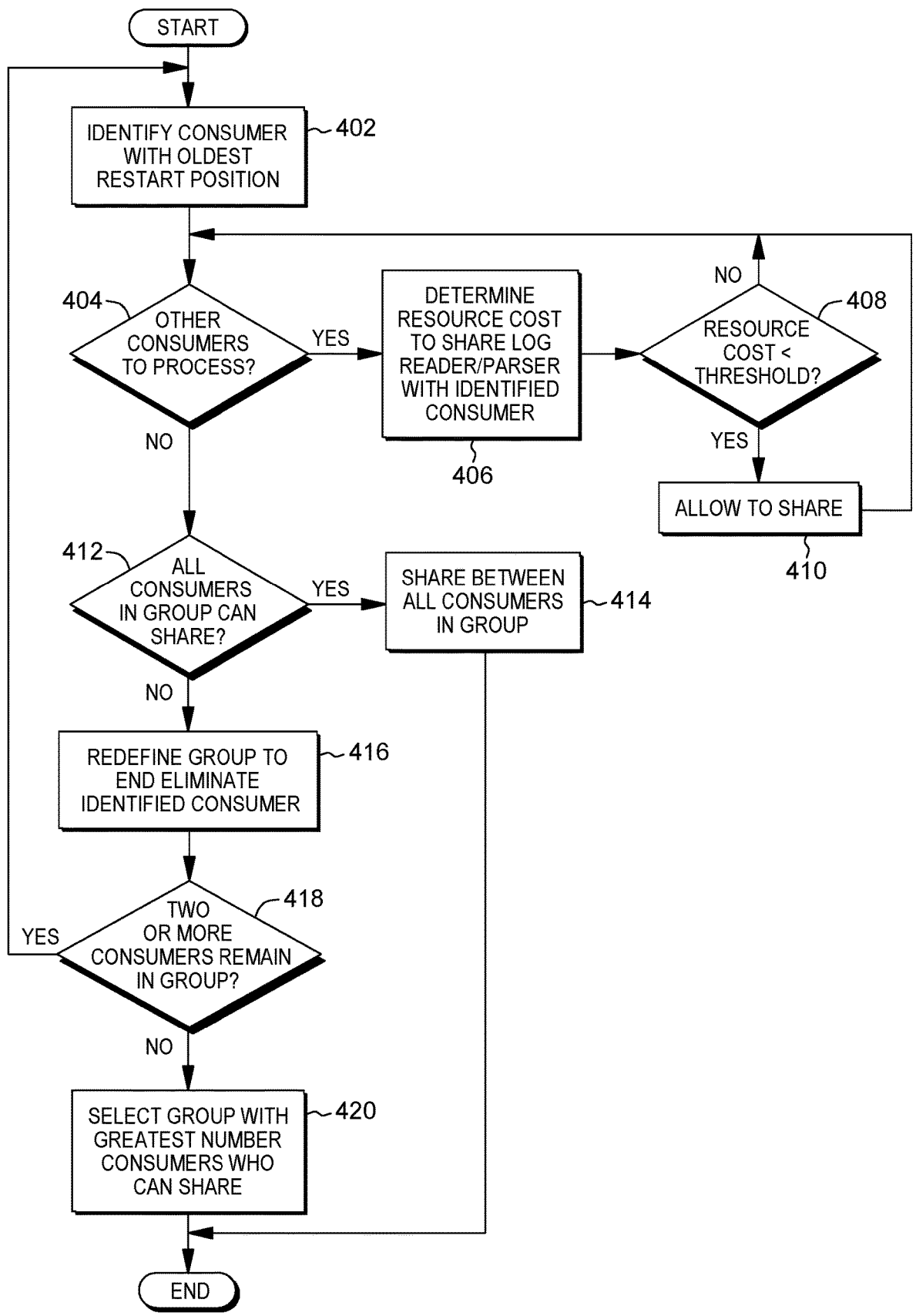
FIG. 4 depicts an example process for determining whether to share a log reader and log parser between any two of more data consumers of a group, in accordance with aspects described herein.

FIG. 4 illustrates the above, depicting an example process for determining whether to share a log reader and log parser between any two of more data consumers of a group, in accordance with aspects described herein. The process can be performed by a computer system, for instance a computer system responsible for managing/coordinating data consumer processing or execution, and more particularly, for instance, a computer system such as one or more described with reference to FIG. 1.

The first scenario (when a shared log reader and parser does not yet exist and the staging store is empty) is described with reference to FIG. 4. Initially, an iterative sharing determination between the data consumers of the group is performed. The sharing determination refers to the process for finding the distances/costs as between the 'oldest' consumer and the others in a given group. The oldest consumer refers to the data consumer with a restart log position that is oldest.

The process of FIG. 4 starts and identifies (402) the data consumer, of the group of data consumers, that has an oldest restart log position of the group. This data consumer is referred to as the 'first data consumer' of the group. The process proceeds by entering a loop that initially determines (404) whether there are any other consumers of that group, other than the first consumer, to process. If so (404, Y), then for one of the other consumers, the process determines (406) the resource (cost A+cost B+cost C) to share a log reader/parser between the other consumer and the identified (first) consumer with the oldest restart position. The process determines (408) whether this resource cost is less than an acceptable predefined latency threshold. This compares the determined resource cost for the identified (first) data consumer and the other data consumer to share the log reader and parser to the latency threshold corresponding to the other data consumer. If so (408, Y), the two consumers are indicated as being allowed to share a reader/parser with a restart position set for the identified (first) consumer (410). Then, or if it was is determined that the resource cost is not less than the threshold (408, N), the process returns to 404 to determine whether there are any other consumers of the group to process. Thus, aspects 404, 406, and 408 form a loop that iterates as long as there are other consumer(s) to process, i.e. until it is determined whether every other consumer of the group is allowed to share with the oldest of the group. At that point, there are no other consumers of the group to process (404, N) and the process determines (412) whether all consumers of the group can share the proposed shared log reader/parser that would start at the oldest consumers restart position. If so (412, Y), the shared reader/parser is shared (414) between all consumers of that group.

Otherwise (412, N), the group is redefined (416) to eliminate the identified oldest ("first") consumer from the group. By this is meant that, on the next iteration of the sharing determination (iterating back to 402 as seen in FIG. 4), that "first" consumer is not considered a member of the group. That results in a new "oldest" or "first" member of the redefined group. Thus, after redefining the group (416), the process determines (418) whether there are two or more consumers that remain in the (now redefined) group. If so (418, Y), the process returns to 402 to iterate the sharing determination for the now redefined group. Otherwise (418, N), there is only one consumer left in the group, so any further sharing determination among one consumer would not make sense. Consequently, the process proceeds by selecting (420) the group of consumers with the greatest number of consumers who can share a log reader/parser. As noted above, in the event of a tie, the group with the most new/young 'oldest' consumer may be the selected group.

A special case of when any two of more data consumers of a group are to share log reader and log parser is the second scenario above, when a shared log reader and parser already exists and it is decided whether an additional consumer is to also share that log reader and parser. For this scenario, the log reader start position is already known because the shared log reader/parser already exists and is running. If the additional consumer's restart log position and current log position are within the bounds of the staging store, then there is no extra cost to join so the additional consumer is allowed to join. If either the restart log position or current log position for the additional consumer is older than that of the oldest operation in the staging store, then the additional consumer is not allowed join with the shared reader/parser because some of the data the consumer needs will be missing from the staging store. If the additional consumer's restart log position is greater than the log position of the last log record read by the log reader, then the extra I/O and processing time (costs A and B) for the shared log reader to catch up to the uncommitted log records this additional consumer needs are computed. If the additional consumer's current log position is greater than the current position of the newest operation added to the staging store, then the extra parsing time (cost C) for the shared parser to catch up to the committed log records this additional consumer needs is calculated, otherwise it is set at 0. As in the prior scenario, the additional consumer is allowed to participate in the shared log reader and log parser if the resource cost (extra time it has to wait, i.e. cost A+cost B+cost C) does not exceed the maximum amount of extra latency tolerated.

Figure 5:
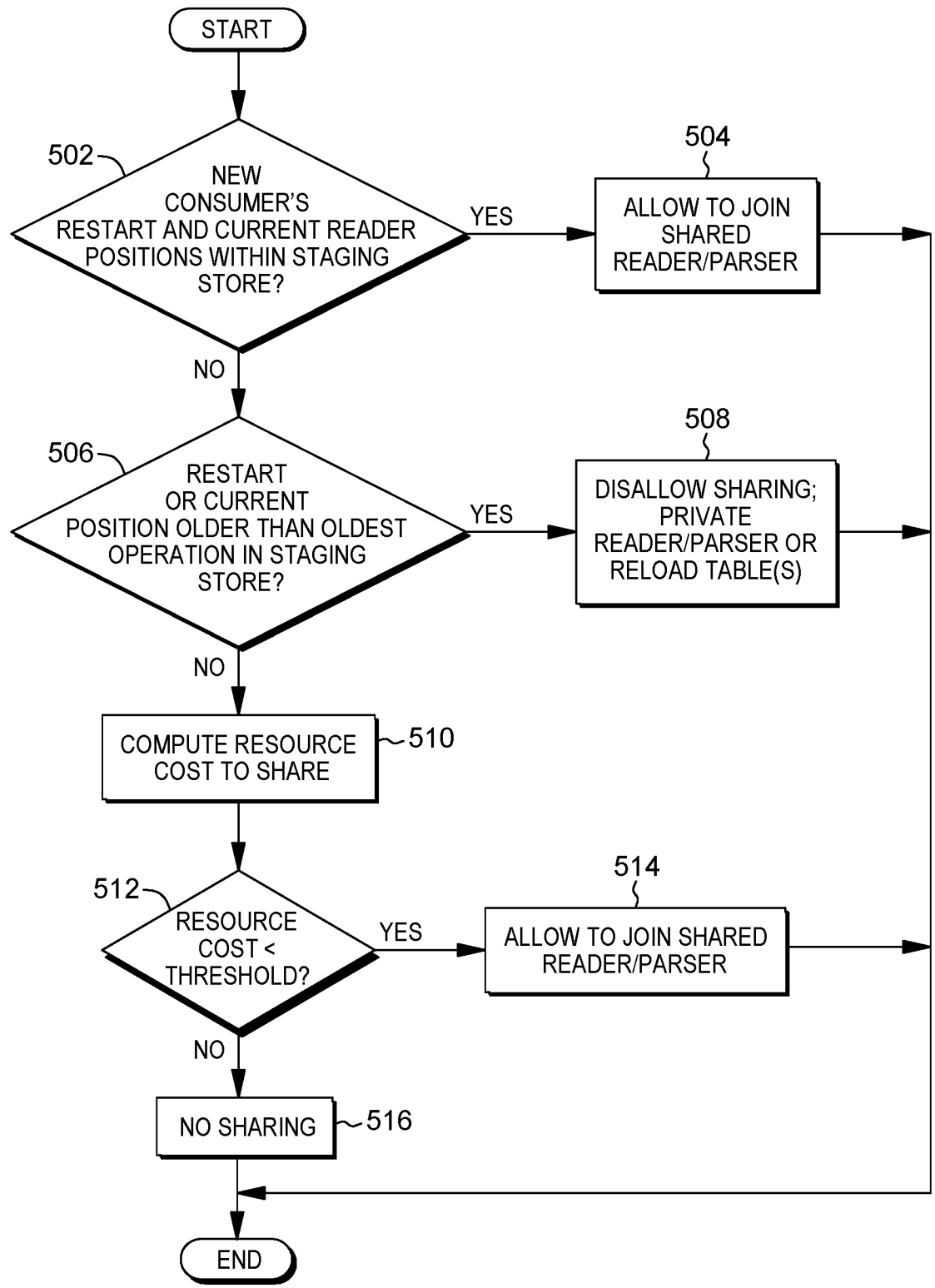
FIG. 5 depicts an example process to determine whether to allow a new data consumer to join in sharing an existing shared log reader and log parser, in accordance with aspects described herein.

FIG. 5 depicts an example process to determine whether to allow a new data consumer to join in sharing an existing shared log reader and log parser, in accordance with aspects described herein. "New" is not imply that the consumer was recently instantiated it instead refers to another consumer, not already sharing the shared reader/parser. The process can be performed by a computer system, for instance a computer system responsible for managing/coordinating data consumer processing or execution, and more particularly, for instance, a computer system such as one or more described with reference to FIG. 1.

The begins by determining (502) whether the new consumer's restart and current log positions are within the staging store. If so (502, Y), the new consumer is allowed to join (504) with the shared reader/parser group. Otherwise (502, N), the process determines (506) whether either of the restart log position and the current log position is/are older than the oldest operation in the staging store. If at least one is older (506, Y), than the process disallows the new consumer from sharing the shared log/reader parser (508), i.e. determines that the new consumer is not to share, and instead is to use a private reader/parser or reload table(s) as described herein.

If neither the restart log position nor the current log position is older than the oldest operation in the staging store (506, N), the process proceeds by computing (510) the resource cost for the new data consumer to share the shared log reader and parser. This resource cost is a function of the costs to read, process, and parse (if applicable) log data of the log files. The process determines (512) whether the resource cost is less than the latency threshold for the new consumer. If so (512, Y), the new consumer is allowed (514) to join the shared reader/parser. Otherwise (512, N), the new consumer is not to share the shared reader/parser (516).

The determination of resource cost for two consumers to share a shared log reader/parser is now described. As noted, resource cost is a composite of cost A to read bytes from the log, cost B to process bytes for in-scope uncommitted log entries, and cost C to parse the log record "payload" (column value) bytes for in-scope committed log entries.

To determine cost A, determine the number of bytes between the two consumer restart positions (LOGREAD_BYTES) using the log distance approaches described herein. Then estimate the amount of time expected to take to read LOGREAD_BYTES from disk (for instance based on disk read capabilities of system) to obtain cost A.

To compute costs B and C, obtain an estimated average percentage of log file data that is in-scope (configured for replication, which translates to how much of the data in the log is of interest to the consumer). Also obtain an estimate of the percentage of bytes to be parsed that belong to each relevant datatype, since the cost to parse log record bytes depends on the datatype. In this vein, obtain a sum of the average row length for all tables and for all in-scope tables, for instance by calling the Java Database Connectivity (JDBC) API DatabaseMetaData.getColumns(null, null, null, null). This returns datatype information for every row of every table. Obtain a running total of column_size (for instance max declared size datatype for each column) for all tables (CS_ALL) and obtain a separate running total of column_size for columns from in-scope tables (CS_INSCOPE). In some examples, for instance for at least variable-length columns, one-half of column_size is used to obtain the average size.

Dividing CS_INSCOPE by CS_ALL provides the estimated percentage of the log file data that will be in-scope (%_INSCOPE). This assumes operations on in-scope and out-of-scope tables are equally likely.

While iterating through the getColumns( ) data, maintain a hash map of the datatypes encountered for in-scope columns. Record the frequency a column with this datatype occurs. The key of the hash map is the datatype id, and the value is the frequency. For each datatype, compute the average column size*frequency to provide the estimated number of bytes, out of the bytes for all table rows, that correspond to this datatype. Dividing this value by CS_IN-SCOPE yields the percentage of in-scope bytes that correspond to this datatype (<datatype>%).

To determine cost B, multiply LOGREAD_BYTES by % INSCOPE (the estimated percentage of these bytes that will be in-scope) to yield LOGREAD_BYTES_INSCOPE. The amount of time expected to take to process this many bytes can be estimated based on the capabilities of the processing computer system. "Processing" in this context can refer to the determination of what transaction this log record is a part of, storing it with the other log records on that transaction, and/or recognizing commit log entries, among other desired operations.

To determine cost C, determine the number of bytes between the two consumer current positions using the log distance algorithms described herein. This provides a number of parse bytes, i.e. PARSE_BYTES. Multiply PARSE_BYTES by % INSCOPE to get PARSE_BYTES_INSCOPE. Compute the number of bytes that need to be parsed. Only the payload bytes of a log record need to be parsed. The non-payload bytes of a log record are a constant or can be estimated by a constant. Refer to these bytes as the OHEAD. To compute the total OHEAD bytes, first estimate the number of log records (NUMRECS) as PARSE_BYTES_INSCOPE/(CS_INSCOPE+OHEAD). TOTAL_OHEAD=NUMRECS*OHEAD. Then, determine the number of bytes to be parsed (PARSE_PAYLOAD_BYTES) as PARSE_BYTES_INSCOPE−TOTAL_OHEAD.

Compute the number of bytes that need to be parsed for each datatype in the hashmap of datatypes. This will be PARSE_PAYLOAD_BYTES*<datatype>%. Estimate the cost to parse this many bytes.

Cost C is then determined as the sum of the cost to parse the bytes for each datatype.

It could be expensive to compute all of these values each time it is desired to determine whether to share a log reader and parser. Therefore, in some embodiments, the values based on in-scope data are computed once at startup and then adjusted when tables come in and out of scope. The total average row length for all tables (CS_ALL) can be recomputed periodically, as desired.

Figure 6:
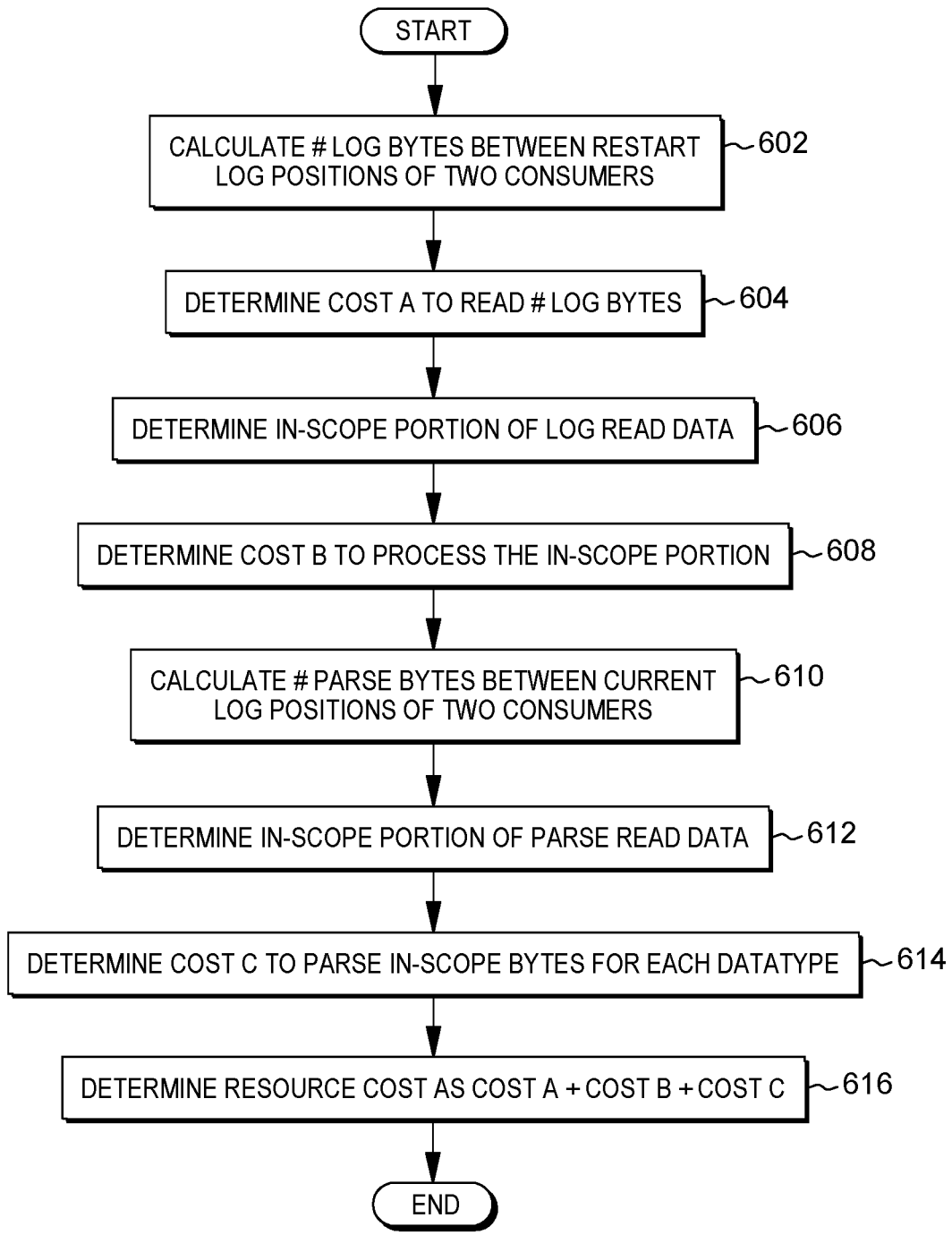
FIG. 6 depicts an example process for determining a resource cost for two data consumers to share a log reader and log parser, in accordance with aspects described herein.

Thus, FIG. 6 depicts an example process for determining a resource cost for two data consumers to share a log reader and log parser, in accordance with aspects described herein. The process can be performed by a computer system, for instance a computer system responsible for managing/coordinating data consumer processing or execution, and more particularly, for instance, a computer system such as one or more described with reference to FIG. 1.

The process begins by determining (602) an amount of log read data (# log bytes) between the pair of data consumers as a distance between a restart log position of a first data consumer of the pair and a restart log position of a second data consumer of the pair. This corresponds to LOGREAD_BYTES above. The process determines (604) cost A as the cost to read this number of log bytes. The process also determines (606) an in-scope portion of the log read data that is in-scope for the pair. This corresponds to LOGREAD_BYTES_INSCOPE above. The process determines (608) cost B as the cost to process this in-scope portion. The process also determines (610) an amount of log parse data (# parse bytes) between the pair as a distance between a current log position of the first data consumer and a current log position of the second data consumer. This corresponds to PARSE_BYTES in the above. The process then determines (612) an in-scope portion of the log parse data that is in-scope for the pair. This corresponds to PARSE_BYTES_INSCOPE. The process determines (614) cost C as the cost to parse the in-scope bytes for each datatype encountered for in-scope columns. Finally, the process determines (616) the resource cost as a function of, for instance the sum of, cost A (the cost to read the amount of log read data), cost B (the cost to process the in-scope portion of the log read data), and cost C (the cost to parse the in-scope portion of the log parse data).

As noted, in some examples when a consumer is not to join in sharing a shared reader/parser, it may be determined whether to reload tables for the consumer instead of using a private reader/parser for that consumer. An example of such a determination is as follows. Compute the cost to read and parse all log records as described herein, except with only the one consumer (the "base" restart and current positions come from the consumer, and the other restart and current positions are the HOL restart log and current log positions). Add the cost to apply (i.e. cost to send ("copy") that many bytes to the target and the cost to perform the corresponding Insert/Update/Delete operations on the target) all of these rows. This is COST_SCRAPE. Then, compute the cost to select all rows from all in-scope tables for that consumer. Add the cost to apply (i.e. the cost for each table to send ("copy") <rowcount>*row size estimate bytes to the target, then the cost to use the target database bulk load utility to insert that many rows and bytes into the database) all of these rows. This is COST_LOAD. If COST_SCRAPE>COST_LOAD, then reload all the tables for the consumer.

Aspects described herein present distinctions over conventional approaches. There are no existing solutions for measuring the number of bytes between two LRIs. Because of this, there are no algorithms to determine, based on this distance in the log, whether a consumer should share a log reader and log parser with another consumer or group of consumers, or if a given consumer would be better off reloading all of its tables rather than running with a private reader/parser.

Provided is a specific example of aspects described herein, in which the source database is an Oracle® database, there are 3 consumers (X, Y, and Z), and initially a shared log reader and log parser does not yet exist and the staging store is empty. A determination is made as to which consumers will share a log reader and parser, and what the starting point to read the log will be.

Assume the following positions for each consumer:
Consumer X: Restart log position (Restart SCN)=1000; Current log position (Current SCN)=1200.
Consumer Y: Restart log position (Restart SCN)=4000; Current log position (Current SCN)=4000.
Consumer Z: Restart log position (Restart SCN)=1200; Current log position (Current SCN)=1300.

Assume the max additional latency that the client is willing to tolerate to facilitate the sharing of a log reader and log parser is 30 seconds for each consumer.

Also assume the following:
Log file size=50 MB;
I/O speed=50 MB/second;
Log record processing speed=100 MB/second;
50% of the data is in-scope; and
CS_ALL=1000, CS_INSCOPE=500, and OHEAD=80.

First determine which consumers can share log readers/parsers if setting the log reader start position to that of the consumer with the oldest restart position. It is seen that this is Consumer X, with restart position 1000.

Determine the distance between that consumer X restart position and consumer Y restart position. Assume SCN 1000 is in log file 42, and SCN 4000 is in log file 57. The number of log files between the two SCNs is therefore 14. Consumer X # bytes after SCN 1000 in log file 42 is determined as described above to be 49 MB, and consumer Y # bytes before SCN 4000 in log file 57 is determined to be 20 MB. Thus, the distance between the two restart positions is 49 MB+20 MB+14*50 MB=769 MB.

Cost A is equal to this number of read bytes (769 MB) divided by the I/O speed of 50 MB/s. Thus, cost A=769 MB/50 MB/s=15.38 seconds.

Cost B is equal to the number of read bytes to process, i.e. log read bytes (769 MB) multiplied by the in-scope percentage of 50%, divided by the log record processing speed (100 MB/s). Thus, cost B=769 MB*0.5/100 MB/s=3.89 seconds.

Also determine the distance between the consumer X current log position (1200) and consumer Y current log position (4000). Assume SCN 1200 is in log file 42, and SCN 4000 is in log file 57. Assume consumer X # bytes after SCN 1200 in log file 42 is 40 MB. Assume consumer Y # bytes before SCN 4000 in log file 57 is 20 MB. The number of log files between the two SCNs is 14. Therefore, the distance between the two current log positions is 40 MB+20 MB+14*50 MB=760 MB.

PARSE_BYTES is 760 MB, therefore PARSE_BYTES_INSCOPE is 760 MB*50%=380 MB. NUMRECS is 380/580=686,998 bytes. TOTAL_OHEAD is NUMRECS*OHEAD=54,959,840 bytes. PARSE_PAYLOAD_BYTES is PARSE_BYTES_INSCOPE (380 MB)−TOTAL_OHEAD (54,959,840 bytes)=343,499,040 bytes.

Using the datatype % for each datatype, compute the total time to parse 343,499,040 bytes. Assuming an average parsing speed of 20 MB/second, cost C=343,499,040 bytes divided by 20 MB/s=16.38 seconds.

Therefore, the total (resource) cost to have consumer Y share consumer X's log reader and parser is the above cost A+cost B+cost C=35.65 seconds.

The resource cost determination repeats as between consumers X and Z. Thus, assuming SCN 1000 is in log file 42, SCN 1200 is also in log file 42, consumer X bytes before SCN 1000 in log file 42 is 1 MB, and consumer Y bytes before SCN 1200 in log file 42 is 11 MB, then the distance between the consumer X restart position and consumer Z restart position is 10 MB. Cost A therefore is equal to Read bytes (10 MB) divided by I/O peed (50 MB per second)=0.20 seconds. Cost B is equal to process bytes (10 MB/2, assuming 50% in-scope) divided by 100 MB per second=0.05 seconds.

To determine the distance between the consumer X current position and consumer Z current position, assuming SCN 1200 is in log file 42, SCN 1300 is also is in log file 42, consumer X # bytes before SCN 1200 in log file 42 is 10 MB, and consumer Y # bytes before SCN 1300 in log file 42 is 31 MB, then the distance is 21 MB. PARSE_BYTES=21 MB, therefore PARSE_BYTES_INSCOPE=10.5 MB. NUMRECS=10.5 MB/580=18,983. TOTAL_OHEAD=1,518,640, therefore PARSE_PAYLOAD_BYTES=9,491,408. Using the datatype % for each datatype, compute the total time to parse 9,491,408 bytes: Assuming an average parsing speed of 20 MB/second, cost C=0.45 seconds. Thus, the total cost to have consumer Z share consumer X log reader and parser is 0.2 seconds+0.05 seconds+0.45 seconds=0.70 seconds.

So, using the consumer X restart point as the starting point for the log reader, it is determined that consumer Y cannot share the log reader with consumer X, as the extra cost of 35.65 seconds would exceed the user's extra latency tolerance (30 seconds). Consumer Z can share the log reader with consumer X, since its extra cost is only 0.70 seconds.

Since not all other consumers (Y and Z) can share with consumer X (the oldest), the group is redefined to exclude consumer X (the oldest), and the sharing determination above is repeated with the log reader start position set to that of the consumer with the second oldest restart position (which is the oldest of the redefined group, i.e. consumer Z). Consumer X is excluded by the redefining because the restart and current position for consumer X is before those of consumer Z; if log reading is started at the restart position for consumer Z, consumer X would not be able to share a log reader and parser.

Thus, the processing is performed to determine whether consumer Z can share the log reader and parser with each other consumer of the redefined group, i.e. only consumer Y. Proceeding through the calculations as described above, it is seen that consumer Y cannot share with consumer Z, as the extra cost exceeds the threshold. So, setting the log reader start position to that of consumer Z does not allow sharing by any consumers.

In this example, the sharing determination is done for two groups: Group 1{X, Y, Z} and Group 2:{Y, Z}. A shared reader/parser is not allowed across all group members of either Group 1 or Group 2, therefore the group with the greatest number of consumers who can share is selected. Here, no sharing takes place among members of Group 2. However, sharing can take place between 2 members of Group 1, i.e. consumers X and Z. Therefore, Group 1 is selected, the shared log reader is started from the restart position for consumer X (1000), and consumer Z is allowed to use the same log reader and parser. Consumer Y runs with a private log reader and parser, or the tables are reloaded for consumer Y.

Note that if the distances in the log between the positions were different, it is possible that all three consumers X, Y and Z could have shared the same log reader and parser. It is also possible that none of them could. Also note that if, after considering all possible log reader start positions, more than one start position allows for consumers to share the log reader and parser, the log reader start position that allows for the most number of consumers to share is selected, and if there were to be a tie, the start position that is the newest would be selected.

Figure 7:
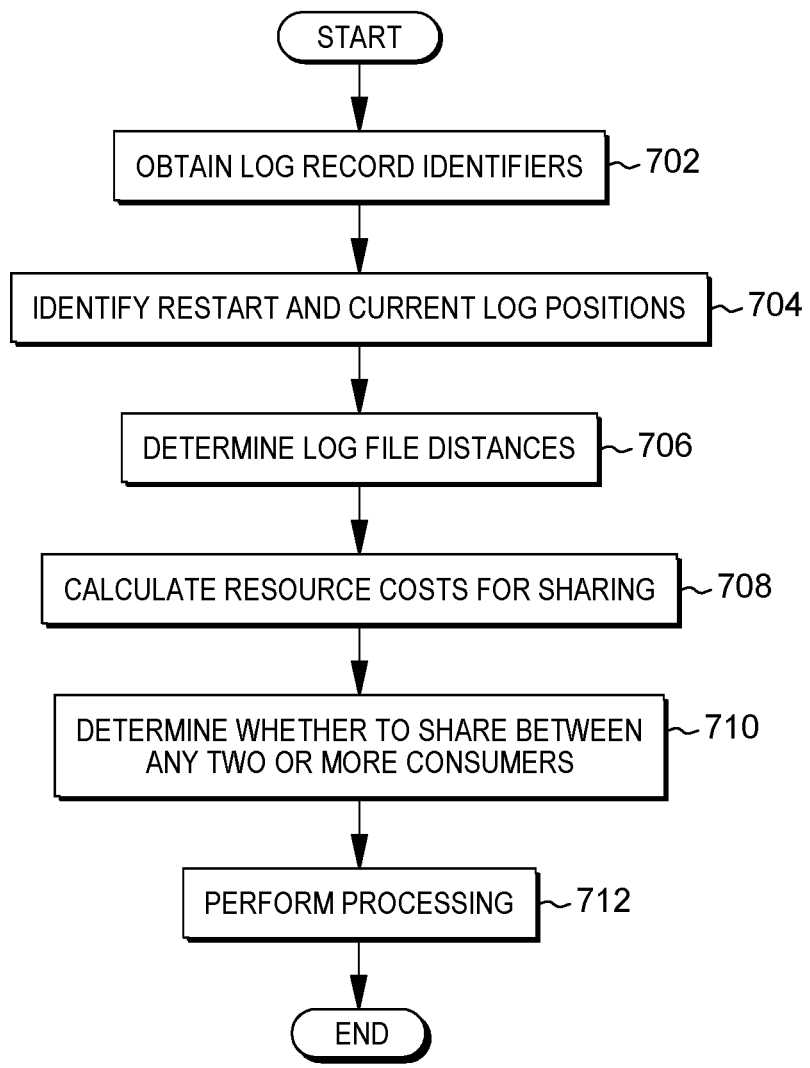
FIG. 7 depicts an example process determining log reader and log parser sharing, in accordance with aspects described herein.

FIG. 7 depicts an example process determining log reader and log parser sharing, in accordance with aspects described herein. In some examples, the process is performed by one or more computer systems, such as those described herein, which may include one or more computer systems of a CDC environment and/or one or more other computer systems.

The process begins by obtaining (702), for a group of data consumers of transaction log file data in transaction log files of a database system, respective log record identifiers (702). The process identifies (704), based on the log record identifiers, a respective restart log position and current log position for each data consumer of the group of data consumers. Using these positions, the process determines (706) transaction log file distances (e.g. byte distances) between the restart log positions and the current log positions of each pair of one or more pairs of data consumers of the group of data consumers. Based on the determined transaction log file distances, the process calculates (708) resource costs for data consumers of each pair of the one or more pairs to share a log reader and log parser. Thus, for any given pair, distances between their restart and current log positions are determined and a calculated resource cost is calculated.

Based on the calculated resource costs, the process determines (710) whether to share a log reader and log parser between any two or more data consumers of the group of data consumers. For instance, data consumers whose resource cost to share with a given consumer is sufficiently low may share with that consumer.

The process then proceeds to perform appropriate processing (712) based on the determining whether to share. The processing performed can be whatever is decided from the determination about whether and which consumers are to share. For instance, the process could include setting up the shared reader/parser and its starting position, and setting up any private reader/parsers for consumers not sharing the shared reader/parser, as examples.

An example of calculating a resource cost for data consumers of a pair of the one or more pairs to share a log reader and log parser (i.e. 708) includes determining an amount of log read data between the pair of data consumers as a distance between a restart log position of a first data consumer of the pair (the one with the older restart log position) and a restart log position of a second data consumer of the pair (the one with the newer restart log position). The calculating can determine an amount of log parse data between the pair as a distance between a current log position of the first data consumer and a current log position of the second data consumer. The calculating can also determine an in-scope portion of the log read data that is in-scope for the pair and in-scope portion of the log parse data that is in-scope for the pair. The resource cost can then be determined as a function of (e.g. sum of) (i) a cost to read the amount of log read data, (ii) a cost to process the in-scope portion of the log read data, and (iii) a cost to parse the in-scope portion of the log parse data.

The determining whether to share a log reader and log parser between any two or more data consumers of the group of data consumers can include performing sharing determination(s) between the data consumers of the group. The sharing determination refers to the process for finding the distances/costs as between the oldest consumer and others in a given group. The sharing determination can include identifying the data consumer, of the group of data consumers, that has an oldest restart log position of the group. This is referred to as the "first" data consumer of that group. Then, for each other data consumer of the group, other than the first data consumer, the following can be performed: comparing a determined resource cost for the first data consumer and the other data consumer to share a log reader and log parser to a latency threshold corresponding to the other data consumer, and identifying, based on the comparing, whether the other data consumer is able to share a log reader and log parser with the first data consumer. After iterating through the other consumers of the group, an indication is obtained for each other consumer in the group as to whether it is able to share with the oldest consumer in the group.

If each other data consumer of the group is identified as able to share a log reader and log parser with the first data consumer, the determining whether to share a log reader and log parser between any two or more data consumers of the group of data consumers includes determining that all data consumers of the group are to share a log reader and log parser. In this case, the performing processing includes setting a restart log position and current log position for the shared log reader and log parser to the restart log position and current log position, respectively, of the first data consumer.

However, in some situations not all consumers in this initial group can share a log reader/parser. In this case, i.e. based on at least one other data consumer of the group being identified as unable to share a log reader and log parser with the first data consumer, the determining whether to share a log reader and log parser between any two or more data consumers further includes iterating, one or more times: redefining the group to exclude the first data consumer, and repeating the sharing determination, but as between the data consumers of the (now redefined) group, i.e. using the redefined group. That iteration will eventually determine whether all consumers of that group can share a reader/parser, and if not, the iterating continues. The iterating stops based on (i) each other data consumer of the redefined group being identified as able to share a log reader and log parser with the first data consumer of the redefined group, and/or (ii) the redefined group having exactly two data consumers. When the redefined group has two data consumers and the sharing determination is performed, at that point the iterating stops because redefining the group at that point would render a single member group for which there cannot possibly be sharing between members of a single member group.

Processing depending on whether the iterating stopped for case (i) or case (ii) above. Based on the iterating stopping for case (i), i.e. at an iteration based on each other data consumer of the group being identified as able to share a log reader and log parser with the first data consumer, the determining whether to share a log reader and log parser between any two or more data consumers of the initial group includes determining that all data consumers of the redefined group of that iteration are to share a log reader and log parser. In this case, the performing processing (712) includes setting a restart log position and current log position for the shared log reader and log parser to the restart log position and current log position, respectively, of the first data consumer of the redefined group.

However, based on the iterating stopping at case (ii), i.e. at an iteration based on the redefined group having exactly two data consumers, the determining whether to share a log reader and log parser between any two or more data consumers of the initial group includes selecting the group, from the initial group and the redefined groups of the iterating, that includes a greatest number of data consumers identified as being able to share a log reader and log parser with the first data consumer of that group. In other words, if the sharing determination were iterated and performed for n number of groups but for none of those groups were all members thereof able to share in a shared reader/parser, then the group, of the n groups, selected is the one for which a highest number of constituent members were able to share a reader/parser.

In this case, it is determined to share a log reader and log parser between the first data consumer of the selected group and all of the data consumers, of that selected group, identified as being able to share a log reader and log parser with that first data consumer of the selected group. The performing processing includes in that case setting a restart log position and current log position for the shared log reader and log parser to the restart log position and current log position, respectively, of the first data consumer of that selected group.

In additional aspects, another data consumer is possibly to be added to an existing group of members sharing a shared reader/parser, and it is to be determined whether to allow the another consumer to join using the shared reader/parser. Based on determining that a restart log position and a current log position for the another data consumer is within bounds of a staging store for the shared log reader and log parser being shared between data consumers of the group, the process shares the shared log reader and log parser with the another data consumer. However, based on determining that a restart log position for the another data consumer, and/or a current position for the another data consumer is older than an oldest operation in a staging store for a shared log reader and log parser being shared between data consumers of the group (i.e. the situation where either the restart or the current log position for the another consumer is older than an oldest operation in a staging store for a shared reader/parser), then the processing determines that the another data consumer is not to share the shared log reader and log parser. Additionally, a selection can be made for the another data consumer. The selection is made as between (i) using, by the another data consumer, a private log reader and log parser, and (ii) reloading in-scope tables of the database for the another data consumer in lieu of the another data consumer using a log reader and log parser.

In one case, it is determined to reload the tables instead of using a private reader/parser for the another consumer. The selecting in this case selects to reload the tables of the database based on a cost to select and load all rows from the in-scope tables for that consumer being less than a calculated resource cost to read, process, and parse log data, of the transaction log files, between (i) restart and current log positions for the another data consumer and (ii) head-of-log restart and current log positions for a head-of-log of the transaction log files of the database system. In another case, the cost to reload is bigger than the resource cost of using a private reader/parser, in which case the private reader/parser is used.

Alternatively, based on determining that (i) a restart log position for the another data consumer is newer than a log position of a last log record read by a shared log reader and log parser being shared between data consumers of the group and (ii) a current log position for the another data consumer is newer than a current log position of a newest operation added to the staging store for the shared log reader, then the processing can determine a resource cost for the another data consumer to share the shared log reader and log parser as a function of costs to read, process, and parse log data of the transaction log files, and determining whether the another data consumer is to share the shared log reader and log parser based on whether that resource cost exceeds a latency threshold for the another data consumer.

In some aspects described herein, distances between log positions are determined. In some cases, to do this, the identifying (704) the restart log position and the current log position for each data consumer of the group of data consumers includes, for each of one or more such consumers, correlating a restart log record identifier for the data consumer to an actual position in the transaction log files and correlating a current log record identifier to an actual position in the transaction log files. The determined transaction log file distances between the restart log positions and the current log positions of a pair of the one or more pairs of data consumers can include a byte distance between the respective restart log positions of the pair and a byte distance between the respective current log positions of the pair.

For a pair of log positions including a first log position, in a first transaction log file of the transaction log files, that is before a second log position, in a second transaction log file of the transaction log files, a byte distance between the first log position and the second log position can be calculated as a function that includes (i) a first offset number of bytes between the first log position and an end of the first transaction log file, (ii) a second offset number of bytes between a beginning of the second transaction log file and the second log position, and (iii) a total number of bytes in any transaction log files between the first transaction log file and second transaction log file. To account for out-of-order records, in some examples the first offset accounts for out-of-order log records in the first transaction log file and the second offset accounts for out-of-order log records in the second transaction log file.

Although various examples are provided, variations are possible without departing from a spirit of the claimed aspects.

Figure 8:
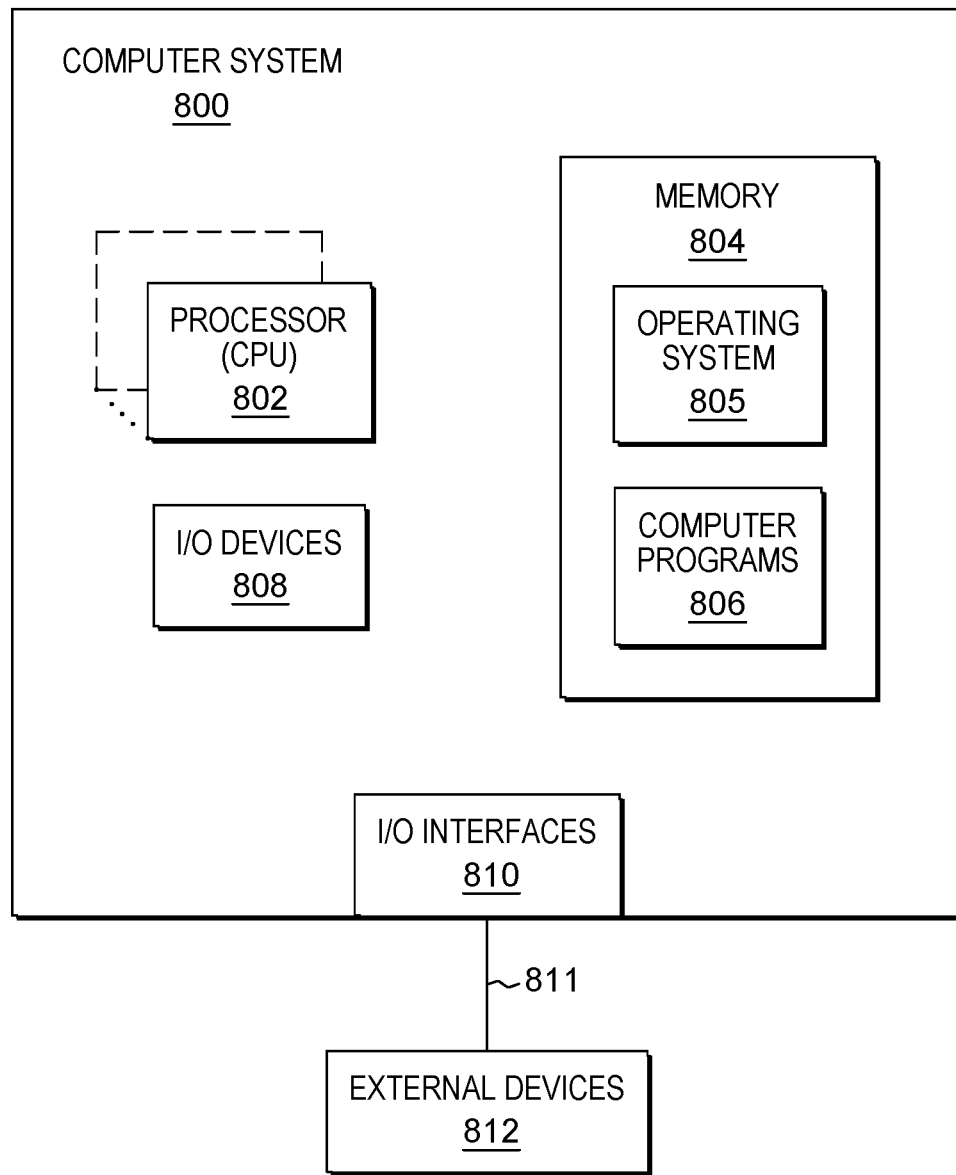
FIG. 8 depicts one example of a computer system and associated devices to incorporate and/or use aspects described herein.

Processes described herein may be performed singly or collectively by one or more computer systems, such as one or more computer systems of a CDC environment, as examples. FIG. 8 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 8 shows a computer system 800 in communication with external device(s) 812. Computer system 800 includes one or more processor(s) 802, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 802 can also include register(s) to be used by one or more of the functional components. Computer system 800 also includes memory 804, input/output (I/O) devices 808, and I/O interfaces 810, which may be coupled to processor(s) 802 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 804 can be or include main or system memory (e.g. Random Access Memory) used in the execution of program instructions, storage device(s) such as hard drive(s), flash media, or optical media as examples, and/or cache memory, as examples. Memory 804 can include, for instance, a cache, such as a shared cache, which may be coupled to local caches (examples include L1 cache, L2 cache, etc.) of processor(s) 802. Additionally, memory 804 may be or include at least one computer program product having a set (e.g., at least one) of program modules, instructions, code or the like that is/are configured to carry out functions of embodiments described herein when executed by one or more processors.

Memory 804 can store an operating system 805 and other computer programs 806, such as one or more computer programs/applications that execute to perform aspects described herein. Specifically, programs/applications can include computer readable program instructions that may be configured to carry out functions of embodiments of aspects described herein.

Examples of I/O devices 808 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (812) coupled to the computer system through one or more I/O interfaces 810.

Computer system 800 may communicate with one or more external devices 812 via one or more I/O interfaces 810. Example external devices include a keyboard, a pointing device, a display, and/or any other devices that enable a user to interact with computer system 800. Other example external devices include any device that enables computer system 800 to communicate with one or more other computing systems or peripheral devices such as a printer. A network interface/adapter is an example I/O interface that enables computer system 800 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 810 and external devices 812 can occur across wired and/or wireless communications link(s) 811, such as Ethernet-based wired or wireless connections. Example wireless connections include cellular, Wi-Fi, Bluetooth®, proximity-based, near-field, or other types of wireless connections. More generally, communications link(s) 811 may be any appropriate wireless and/or wired communication link(s) for communicating data.

Particular external device(s) 812 may include one or more data storage devices, which may store one or more programs, one or more computer readable program instructions, and/or data, etc. Computer system 800 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 800 may be operational with numerous other general purpose or special purpose computing system environments or configurations. Computer system 800 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
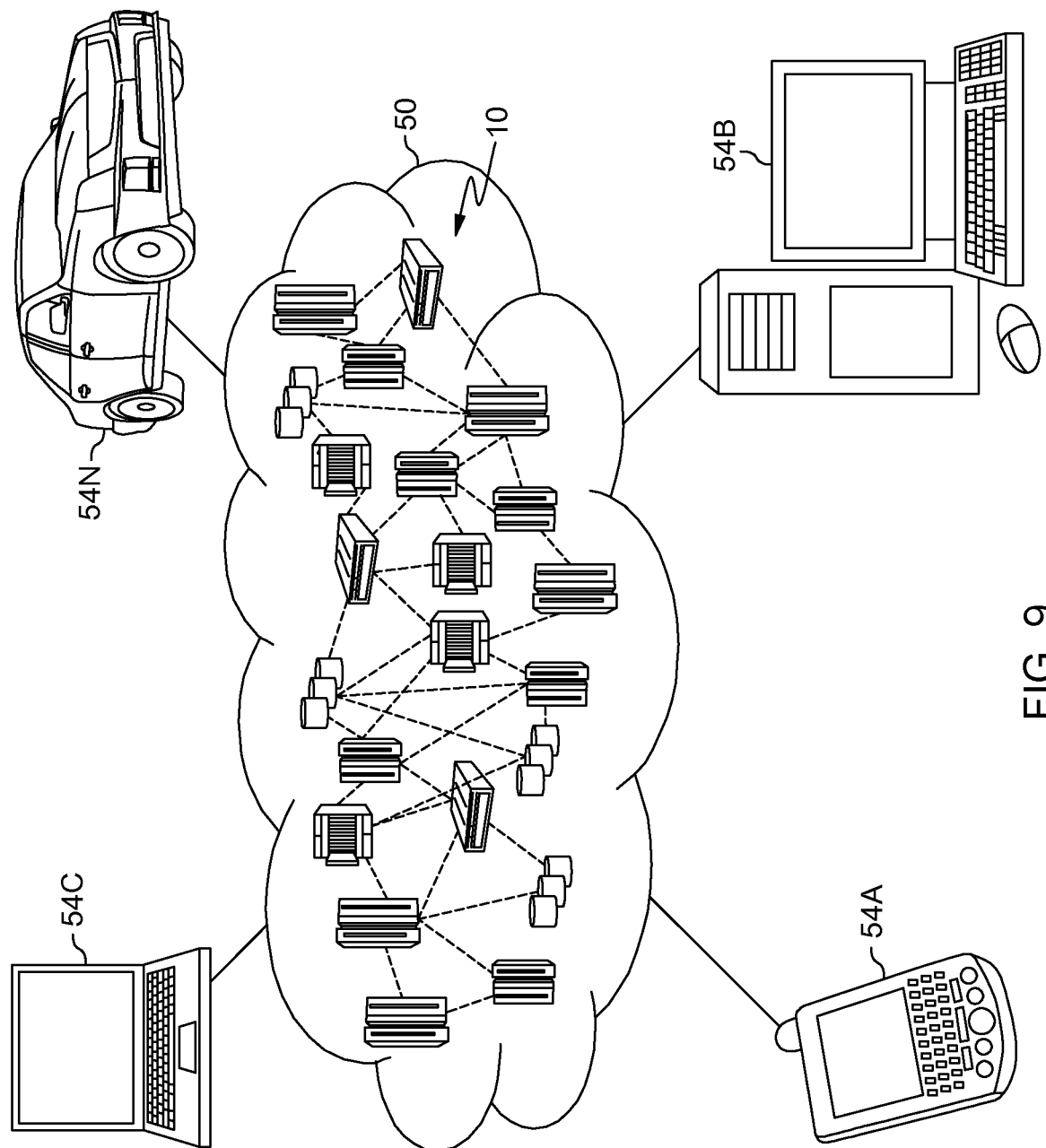
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
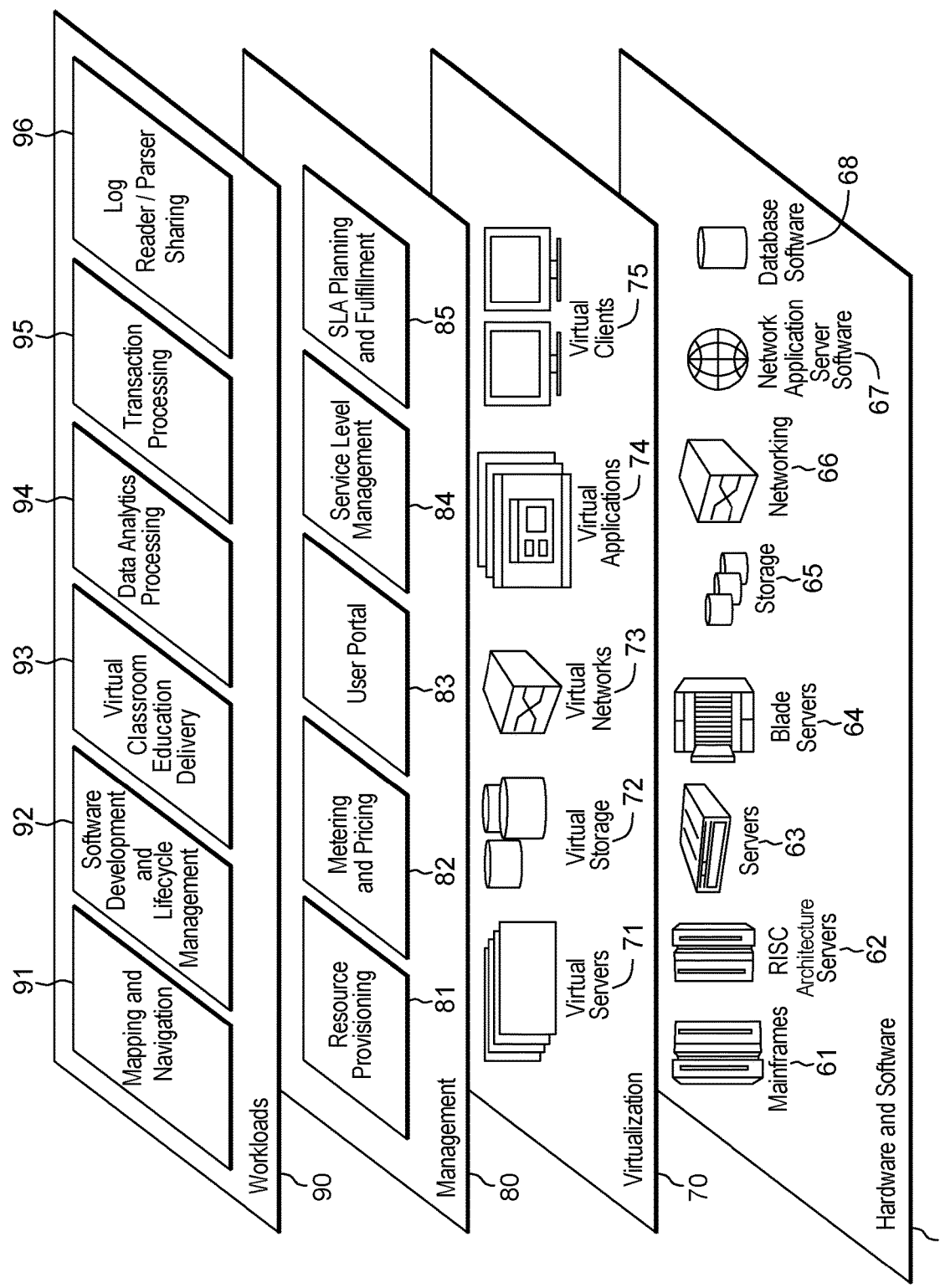
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and log reader/parser sharing determinations 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
obtaining, for a group of data consumers of transaction log file data in transaction log files of a database system, respective log record identifiers, the data consumers of the group of data consumers each being a respective software entity that accesses the transaction log file data, and each of the log record identifiers identifying a specific log record in the transaction log file data;
identifying for each data consumer of the group of data consumers, and based on the log record identifiers, a respective restart log position and current log position for the data consumer, the restart log position for the data consumer and the current log position for the data consumer each identifying a respective specific log record in the transaction log file data;
determining transaction log file distances between the restart log positions and the current log positions of each pair of one or more pairs of data consumers of the group of data consumers, wherein the transaction log file distances comprise, for a pair of the one or more pairs, an amount of transaction log file data separating the log record identified by the restart log position of a first data consumer of the pair from the log record identified by the restart log position of a second data consumer of the pair, and an amount of transaction log file data separating the log record identified by the current log position of the first data consumer from the log record identified by the current log position of the second data consumer;
based on the determined transaction log file distances, calculating resource costs for data consumers of each pair of the one or more pairs to share a log reader and log parser;
based on the calculated resource costs, determining whether to share a log reader and log parser between any two or more data consumers of the group of data consumers; and
performing processing based on the determining whether to share.

2. The method of claim 1, wherein calculating a resource cost for data consumers of the pair of the one or more pairs to share a log reader and log parser comprises:
determining the amount of transaction log file data separating the log record identified by the restart log position of the first data consumer from the log record identified by the restart log position of a second data consumer to be an amount of log read data between the pair;
determining an in-scope portion of the log read data that is in-scope for the pair;
determining the amount of transaction log file data separating the log record identified by the current log position of the first data consumer from the log record identified by the current log position of the second data consumer to be an amount of log parse data between the pair;
determining an in-scope portion of the log parse data that is in-scope for the pair; and
determining the resource cost as a function of (i) a cost to read the amount of log read data, (ii) a cost to process the in-scope portion of the log read data, and (iii) a cost to parse the in-scope portion of the log parse data.

3. The method of claim 1, wherein the determining whether to share a log reader and log parser between any two or more data consumers of the group of data consumers comprises performing a sharing determination between the data consumers of the group, the sharing determination comprising:
identifying the data consumer, of the group of data consumers, that has an oldest restart log position of the group, the data consumer that has the oldest restart log position being a first data consumer of the group;
for each other data consumer of the group, other than the first data consumer of the group, performing:
comparing a determined resource cost for the first data consumer of the group and the other data consumer of the group to share a log reader and log parser to a latency threshold corresponding to the other data consumer of the group; and
identifying, based on the comparing, whether the other data consumer of the group is able to share a log reader and log parser with the first data consumer of the group.

4. The method of claim 3, wherein, based on each other data consumer of the group being identified as able to share a log reader and log parser with the first data consumer of the group, the determining whether to share a log reader and log parser between any two or more data consumers of the group of data consumers comprises determining that all data consumers of the group are to share a log reader and log parser, and wherein the performing processing comprises setting a restart log position and current log position for the shared log reader and log parser to the restart log position and current log position, respectively, of the first data consumer of the group.

5. The method of claim 3, wherein the group of data consumers is an initial group, and wherein, based on at least one other data consumer of the group being identified as unable to share a log reader and log parser with the first data consumer of the group, the determining whether to share a log reader and log parser between any two or more data consumers of the group further comprises iterating, one or more times:
  redefining the group to exclude the first data consumer of the group; and
  repeating performing the sharing determination between the data consumers of the group, using the redefined group;
  wherein the iterating stops based on at least one selected from the group consisting of: (i) each other data consumer of the redefined group being identified as able to share a log reader and log parser with the first data consumer of the redefined group, and (ii) the redefined group having exactly two data consumers.

6. The method of claim 5, wherein based on the iterating stopping at an iteration based on each other data consumer of the group being identified as able to share a log reader and log parser with the first data consumer of the group, the determining whether to share a log reader and log parser between any two or more data consumers of the initial group comprises determining that all data consumers of the redefined group of that iteration are to share a log reader and log parser, and wherein the performing processing comprises setting a restart log position and current log position for the shared log reader and log parser to the restart log position and current log position, respectively, of the first data consumer of the redefined group.

7. The method of claim 5, wherein based on the iterating stopping at an iteration being based on the redefined group having exactly two data consumers, the determining whether to share a log reader and log parser between any two or more data consumers of the initial group comprises:
  selecting a group, from the initial group and the redefined groups of the iterating, that includes a greatest number of data consumers identified as being able to share a log reader and log parser with the first data consumer of that selected group;
  determining to share a log reader and log parser between the first data consumer of the selected group and all of the data consumers, of that selected group, identified as being able to share a log reader and log parser with that first data consumer of the selected group, wherein the performing processing comprises setting a restart log position and current log position for the shared log reader and log parser to the restart log position and current log position, respectively, of the first data consumer of that selected group.

8. The method of claim 1, further comprising, based on determining that a restart log position and a current log position for another data consumer is within bounds of a staging store for a shared log reader and log parser being shared between data consumers of the group, sharing the shared log reader and log parser with the another data consumer.

9. The method of claim 1, further comprising, based on determining that at least one selected from the group consisting of: (i) a restart log position for another data consumer and (ii) a current position for the another data consumer is older than an oldest operation in a staging store for a shared log reader and log parser being shared between data consumers of the group:
  determining that the another data consumer is not to share the shared log reader and log parser; and
  selecting, for the another data consumer, between the group consisting of (i) using, by the another data consumer, a private log reader and log parser, and (ii) reloading in-scope tables of the database for the another data consumer in lieu of the another data consumer using a log reader and log parser.

10. The method of claim 9, wherein the selecting selects to reload the tables of the database based on a cost to select and load all rows from the in-scope tables being less than a calculated resource cost to read, process, and parse log data, of the transaction log files, between (i) restart and current log positions for the another data consumer and (ii) head-of-log restart and current log positions for a head-of-log of the transaction log files of the database system.

11. The method of claim 1, further comprising, based on determining that (i) a restart log position for another data consumer is newer than a log position of a last log record read by a shared log reader and log parser being shared between data consumers of the group and (ii) a current log position for the another data consumer is newer than a current log position of a newest operation added to the staging store for the shared log reader, performing:
  determining a resource cost for the another data consumer to share the shared log reader and log parser as a function of costs to read, process, and parse log data of the transaction log files; and
  determining whether the another data consumer is to share the shared log reader and log parser based on whether the resource cost exceeds a latency threshold for the another data consumer.

12. The method of claim 1, wherein the identifying the restart log position and the current log position for each data consumer of the group of data consumers comprises correlating a restart log record identifier for the data consumer to an actual position in the transaction log files and correlating a current log record identifier to an actual position in the transaction log files, and wherein the determined transaction log file distances between the restart log positions and the current log positions of the pair of the one or more pairs comprise a byte distance between the respective restart log positions of the pair and a byte distance between the respective current log positions of the pair.

13. The method of claim 12, wherein, for a pair of log positions comprising a first log position, in a first transaction log file of the transaction log files, that is before a second log position, in a second transaction log file of the transaction log files, a byte distance between the first log position and the second log position is calculated as a function comprising (i) a first offset number of bytes between the first log position and an end of the first transaction log file, (ii) a second offset number of bytes between a beginning of the second transaction log file and the second log position, and (iii) a total number of bytes in any transaction log files between the first transaction log file and second transaction log file.

14. The method of claim 13, wherein the first offset accounts for out-of-order log records in the first transaction log file and the second offset accounts for out-of-order log records in the second transaction log file.

15. A computer system comprising:
a memory; and
a processor in communication with the memory, wherein the computer system is configured to perform a method comprising:
obtaining, for a group of data consumers of transaction log file data in transaction log files of a database system, respective log record identifiers, the data consumers of the group of data consumers each being a respective software entity that accesses the transaction log file data, and each of the log record identifiers identifying a specific log record in the transaction log file data;
identifying for each data consumer of the group of data consumers, and based on the log record identifiers, a respective restart log position and current log position for the data consumer, the restart log position for the data consumer and the current log position for the data consumer each identifying a respective specific log record in the transaction log file data;
determining transaction log file distances between the restart log positions and the current log positions of each pair of one or more pairs of data consumers of the group of data consumers, wherein the transaction log file distances comprise, for a pair of the one or more pairs, an amount of transaction log file data separating the log record identified by the restart log position of a first data consumer of the pair from the log record identified by the restart log position of a second data consumer of the pair, and an amount of transaction log file data separating the log record identified by the current log position of the first data consumer from the log record identified by the current log position of the second data consumer;
based on the determined transaction log file distances, calculating resource costs for data consumers of each pair of the one or more pairs to share a log reader and log parser;
based on the calculated resource costs, determining whether to share a log reader and log parser between any two or more data consumers of the group of data consumers; and
performing processing based on the determining whether to share.

16. The computer system of claim 15, wherein the determining whether to share a log reader and log parser between any two or more data consumers of the group of data consumers comprises performing a sharing determination between the data consumers of the group, the sharing determination comprising:
identifying the data consumer, of the group of data consumers, that has an oldest restart log position of the group, the data consumer that has the oldest restart log position being a first data consumer of the group;
for each other data consumer of the group, other than the first data consumer of the group, performing:
comparing a determined resource cost for the first data consumer of the group and the other data consumer of the group to share a log reader and log parser to a latency threshold corresponding to the other data consumer of the group; and
identifying, based on the comparing, whether the other data consumer of the group is able to share a log reader and log parser with the first data consumer of the group;
wherein the group of data consumers is an initial group, and wherein, based on at least one other data consumer of the group being identified as unable to share a log reader and log parser with the first data consumer of the group, the determining whether to share a log reader and log parser between any two or more data consumers of the group further comprises iterating, one or more times:
redefining the group to exclude the first data consumer of the group; and
repeating performing the sharing determination between the data consumers of the group, using the redefined group;
wherein the iterating stops based on at least one selected from the group consisting of: (i) each other data consumer of the redefined group being identified as able to share a log reader and log parser with the first data consumer of the redefined group, and (ii) the redefined group having exactly two data consumers.

17. The computer system of claim 15, wherein the method further comprises, based on determining that at least one selected from the group consisting of: (i) a restart log position for another data consumer and (ii) a current position for the another data consumer is older than an oldest operation in a staging store for a shared log reader and log parser being shared between data consumers of the group:
determining that the another data consumer is not to share the shared log reader and log parser; and
selecting, for the another data consumer, between the group consisting of (i) using, by the another data consumer, a private log reader and log parser, and (ii) reloading in-scope tables of the database for the another data consumer in lieu of the another data consumer using a log reader and log parser;
wherein the selecting selects to reload the tables of the database based on a cost to select and load all rows from the in-scope tables being less than a calculated resource cost to read, process, and parse log data, of the transaction log files, between (i) restart and current log positions for the another data consumer and (ii) head-of-log restart and current log positions for a head-of-log of the transaction log files of the database system.

18. The computer system of claim 15, wherein the method further comprises, based on determining that (i) a restart log position for another data consumer is newer than a log position of a last log record read by a shared log reader and log parser being shared between data consumers of the group and (ii) a current log position for the another data consumer is newer than a current log position of a newest operation added to the staging store for the shared log reader, performing:
determining a resource cost for the another data consumer to share the shared log reader and log parser as a function of costs to read, process, and parse log data of the transaction log files; and
determining whether the another data consumer is to share the shared log reader and log parser based on whether the resource cost exceeds a latency threshold for the another data consumer.

19. A computer program product comprising:
a computer readable storage medium readable by a processing circuit and storing instructions for execution by the processing circuit for performing a method comprising:
obtaining, for a group of data consumers of transaction log file data in transaction log files of a database system, respective log record identifiers, the data consumers of the group of data consumers each being a respective software entity that accesses the transaction log file data, and each of the log record identifiers identifying a specific log record in the transaction log file data;

identifying for each data consumer of the group of data consumers, and based on the log record identifiers, a respective restart log position and current log position for each data consumer, the restart log position for the data consumer and the current log position for the data consumer each identifying a respective specific log record in the transaction log file data;

determining transaction log file distances between the restart log positions and the current log positions of each pair of one or more pairs of data consumers of the group of data consumers, wherein the transaction log file distances comprise, for a pair of the one or more pairs, an amount of transaction log file data separating the log record identified by the restart log position of a first data consumer of the pair from the log record identified by the restart log position of a second data consumer of the pair, and an amount of transaction log file data separating the log record identified by the current log position of the first data consumer from the log record identified by the current log position of the second data consumer;

based on the determined transaction log file distances, calculating resource costs for data consumers of each pair of the one or more pairs to share a log reader and log parser;

based on the calculated resource costs, determining whether to share a log reader and log parser between any two or more data consumers of the group of data consumers; and performing processing based on the determining whether to share.

20. The computer program product of claim 19, wherein the determining whether to share a log reader and log parser between any two or more data consumers of the group of data consumers comprises performing a sharing determination between the data consumers of the group, the sharing determination comprising:

identifying the data consumer, of the group of data consumers, that has an oldest restart log position of the group, the data consumer that has the oldest restart log position being a first data consumer of the group;

for each other data consumer of the group, other than the first data consumer of the group, performing:
comparing a determined resource cost for the first data consumer of the group and the other data consumer of the group to share a log reader and log parser to a latency threshold corresponding to the other data consumer of the group; and
identifying, based on the comparing, whether the other data consumer of the group is able to share a log reader and log parser with the first data consumer of the group;

wherein the group of data consumers is an initial group, and wherein, based on at least one other data consumer of the group being identified as unable to share a log reader and log parser with the first data consumer of the group, the determining whether to share a log reader and log parser between any two or more data consumers of the group further comprises iterating, one or more times:

redefining the group to exclude the first data consumer of the group; and repeating performing the sharing determination between the data consumers of the group, using the redefined group;

wherein the iterating stops based on at least one selected from the group consisting of: (i) each other data consumer of the redefined group being identified as able to share a log reader and log parser with the first data consumer of the redefined group, and (ii) the redefined group having exactly two data consumers.

* * * * *